United States Patent
Islam et al.

(10) Patent No.: US 6,587,259 B2
(45) Date of Patent: Jul. 1, 2003

(54) SYSTEM AND METHOD FOR CONTROLLING NOISE FIGURE

(75) Inventors: Mohammed N. Islam, Allen, TX (US); Carl A. DeWilde, Richardson, TX (US); Michael J. Freeman, Canton, MI (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 09/916,454

(22) Filed: Jul. 27, 2001

(65) Prior Publication Data

US 2003/0021008 A1 Jan. 30, 2003

(51) Int. Cl.[7] ............................. H04B 10/00; H01S 3/30
(52) U.S. Cl. ...................................... 359/334; 359/161
(58) Field of Search ........................... 359/334, 161, 359/337.1, 337.11

(56) References Cited

U.S. PATENT DOCUMENTS

| | | | |
|---|---|---|---|
| 3,772,528 A | 11/1973 | Anderson | 307/88.3 |
| 4,616,898 A | 10/1986 | Hicks, Jr. | 359/334 |
| 4,700,339 A | 10/1987 | Gordon et al. | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,117,196 A | 5/1992 | Epworth et al. | 359/333 |
| 5,224,194 A | 6/1993 | Islam | 385/122 |
| 5,225,922 A | 7/1993 | Chraplyvy et al. | 359/124 |
| 5,271,024 A | 12/1993 | Huber | 372/6 |
| 5,293,545 A | 3/1994 | Huber | 359/111 |
| 5,369,519 A | 11/1994 | Islam | 359/173 |
| 5,485,536 A | 1/1996 | Islam | 385/31 |
| 5,557,442 A | 9/1996 | Huber | 359/179 |
| 5,559,920 A | 9/1996 | Chraplyvy et al. | 385/123 |
| 5,623,508 A | 4/1997 | Grubb et al. | 372/3 |
| 5,633,750 A | 5/1997 | Nogiwa et al. | 359/341 |
| 5,664,036 A | 9/1997 | Islam | 385/31 |

(List continued on next page.)

FOREIGN PATENT DOCUMENTS

| | | | |
|---|---|---|---|
| EP | 0 829 980 A2 | 3/1998 | H04J/14/02 |
| EP | 0 903 876 A1 | 3/1999 | H04B/10/17 |
| EP | 0 903 877 A2 | 3/1999 | H04B/10/18 |

(List continued on next page.)

OTHER PUBLICATIONS

Haus, Hermann, "Optimum Noise Performance of Optical Amplifiers." J. Quantum Electronics, 37:6, Jun. 2001, pp. 813–823.*

(List continued on next page.)

*Primary Examiner*—Thomas G. Black
*Assistant Examiner*—Andrew R. Sommer
(74) *Attorney, Agent, or Firm*—Baker Botts L.L.P.

(57) ABSTRACT

One aspect of the invention includes an optical amplifier operable to amplify a plurality of optical wavelength signals at least in part through Raman amplification. The amplifier includes an input operable to receive a plurality of wavelength signals and an output operable to communicate an amplified version of at least some of the plurality of wavelength signals. The amplifier further includes a pump assembly operable to generate one or more pump signals and a gain medium operable to receive the plurality of wavelength signals and the one or more pump signals and to facilitate amplification of at least some of the plurality of wavelength signals. The amplifier has associated with it a noise figure having a shape varying as a function of wavelength. At least one of the one or more pump signals is operable to have its power varied to selectively control the shape of the noise figure.

112 Claims, 10 Drawing Sheets

U.S. PATENT DOCUMENTS

| | | | |
|---|---|---|---|
| 5,673,280 A | 9/1997 | Grubb et al. | 372/3 |
| 5,778,014 A | 7/1998 | Islam | 372/6 |
| 5,790,289 A | 8/1998 | Taga et al. | 359/124 |
| 5,796,909 A | 8/1998 | Islam | 385/147 |
| 5,801,860 A | 9/1998 | Yoneyama | 359/124 |
| 5,815,518 A | 9/1998 | Reed et al. | 372/6 |
| 5,847,862 A | 12/1998 | Chraplyvy et al. | 359/337 |
| 5,852,510 A | 12/1998 | Meli et al. | 359/341 |
| 5,861,981 A | 1/1999 | Jabr | 359/341 |
| 5,880,866 A | 3/1999 | Stolen | 359/138 |
| 5,887,093 A | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,959,750 A | 9/1999 | Eskildsen et al. | 359/134 |
| 5,959,766 A | 9/1999 | Otterbach et al. | 359/337 |
| 5,978,130 A | 11/1999 | Fee et al. | 359/341 |
| 5,995,275 A * | 11/1999 | Sugaya | 359/160 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,052,393 A | 4/2000 | Islam | 372/6 |
| 6,055,092 A | 4/2000 | Sugaya et al. | 359/337 |
| 6,067,177 A | 5/2000 | Kanazawa | 359/124 |
| 6,072,601 A | 6/2000 | Toyohara | 358/484 |
| 6,088,152 A | 7/2000 | Berger et al. | 359/334 |
| 6,094,296 A | 7/2000 | Kosaka | 359/341 |
| 6,101,024 A | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,115,174 A | 9/2000 | Grubb et al. | 359/334 |
| 6,134,034 A | 10/2000 | Terahara | 359/124 |
| 6,147,794 A | 11/2000 | Stentz | 359/334 |
| 6,151,160 A | 11/2000 | Ma et al. | 359/341 |
| 6,163,636 A | 12/2000 | Stentz et al. | 385/24 |
| 6,172,803 B1 | 1/2001 | Masuda et al. | 359/341 |
| 6,181,464 B1 | 1/2001 | Kidorf et al. | 359/334 |
| 6,185,022 B1 | 2/2001 | Harasawa | 359/124 |
| 6,219,162 B1 | 4/2001 | Barnard et al. | 359/124 |
| 6,219,176 B1 | 4/2001 | Terahara | 359/341 |
| 6,229,937 B1 | 5/2001 | Nolan et al. | 385/24 |
| 6,239,902 B1 | 5/2001 | Islam et al. | 359/334 |
| 6,239,903 B1 | 5/2001 | Islam et al. | 359/337 |
| 6,263,139 B1 | 7/2001 | Kawakami et al. | 385/123 |
| 6,271,945 B1 | 8/2001 | Terahara | 359/124 |
| 6,282,002 B1 * | 8/2001 | Grubb et al. | 359/134 |
| 6,310,716 B1 | 10/2001 | Evans et al. | 359/334 |
| 6,320,884 B1 | 11/2001 | Kerfoot, III et al. | 372/3 |
| 6,335,820 B1 | 1/2002 | Islam | 359/334 |
| 6,341,034 B1 | 1/2002 | Sun et al. | 359/341.4 |
| 6,344,922 B1 * | 2/2002 | Grubb et al. | 359/134 |
| 6,356,383 B1 * | 3/2002 | Cornwell et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,388,801 B1 * | 5/2002 | Sugaya et al. | 359/334 |
| 6,396,624 B1 * | 5/2002 | Nissov et al. | 359/337.2 |
| 6,404,523 B1 | 6/2002 | Morikawa et al. | 359/124 |
| 6,404,964 B1 | 6/2002 | Bhagavatula et al. | 385/123 |
| 6,414,786 B1 | 7/2002 | Foursa | 359/334 |
| 6,417,959 B1 * | 7/2002 | Bolshtyansky et al. | 359/334 |
| 6,437,906 B1 | 8/2002 | Di Pasquale et al. | 359/337.2 |
| 6,466,362 B1 * | 10/2002 | Friedrich | 359/334 |
| 2001/0014194 A1 | 8/2001 | Sasaoka et al. | 385/15 |
| 2001/0050802 A1 * | 12/2001 | Namiki et al. | 359/334 |
| 2002/0001123 A1 | 1/2002 | Miyakawa et al. | 359/334 |
| 2002/0048062 A1 | 4/2002 | Sakamoto et al. | 359/124 |
| 2002/0060821 A1 | 5/2002 | Manna et al. | 359/124 |
| 2002/0063949 A1 * | 5/2002 | Cornwell et al. | 359/334 |

FOREIGN PATENT DOCUMENTS

| | | | |
|---|---|---|---|
| EP | 0 911 926 A1 | 4/1999 | H01S/3/10 |
| EP | 0959 578 A2 | 11/1999 | H04J/14/02 |
| EP | 1 054 489 A2 | 11/2000 | H01S/3/067 |
| EP | 1 069 712 A2 | 1/2001 | H04B/10/17 |
| EP | 0 903 876 B1 | 2/2001 | H04B/10/17 |
| EP | 1 180 860 A1 | 2/2001 | H04B/10/17 |
| WO | 98/20587 | 5/1998 | H01S/3/30 |
| WO | 98/36479 | 8/1998 | H01S/3/10 |
| WO | 98/42088 | 9/1998 | H04B/10/17 |
| WO | 99/43117 | 8/1999 | H04J/14/00 |
| WO | 99/66607 | 12/1999 | |
| WO | 00/49721 | 8/2000 | |
| WO | 00/72479 | 11/2000 | H04B/10/08 |
| WO | 00/73826 A2 | 12/2000 | G02B/6/00 |

OTHER PUBLICATIONS

Aoki, Yasuhiro, "Properties of Fiber Raman Amplifiers and Their Applicability to Digital Optical Communication Systems." J. Lightwave Tech. 6:7, Jul. 1988, pp. 1225–1239.*

Kawai et al. "Ultrawide, 75–nm 3–dB gain–band optical amplifeir utilizing erbium–doped flouride fiber and Raman fiber." OFC'98 Tech. Digest, 1998, pp. 32–33.*

Haus, Hermann A. "Optimum Noise Performance of Optical Amplifiers." IEEE J. Quantum Elect. 37:6, Jun. 2001, pp. 813–823.*

Fludger et al. "Fundamental Noise Limits in Broadband Raman Amplifiers." OFC 2001, Mar. 2001, pp. MA5/1–MA5/3, vo9 1.*

Agrawal, Govind P. "Fiber–Optic Communication Systems." John Wiley & Sons, Inc. 1997, pp. 365–366.*

Chien–Jen et al. "Transient Effects in Saturated Raman Amplifiers." Elect. Lett. Mar. 15, 2001, pp. 371–373.*

Chernikov et al. "Broadband Raman Amplifiers in the Spectral Range of 1480–1620 nm." OFC/IOOC'99 Tech. Digest, pp. 117–119, vol. 2.*

Chraplyvy et al., "Equalization in Amplified WDM Lightwave Transmission Systems," IEEE Photonics Technology Letters, vol. 4, No. 8, pp. 920–922. Aug. 1992.

Hansen et al., "Repeaterless transmission experiment employing dispersion," 21st European Conference on Optical Communication, vol. 2, 1 page. Sep. 17–21, 1995.

Yamada et al., "A Low–Noise and Gain–Flattened Amplifier Composed of a Silica–Based and a Fluoride–Based Er3+ Doped Fiber amplifier in a Cascade Configuration," IEEE Photonics Letters, vol. 8, No. 5, pp. 620–622, May 1996.

Liaw et al., "Passive Gain–Equalized Wide–Band Erbium–Doped Fiber Amplifier Using Samarium–Doped Fiber," IEEE Photonics Technology Letters, vol. 8, No. 7, pp. 879–881, Jul. 1996.

White et al.; "Optical Fiber Components and Devices," Optical Fiber Telecommunications, Ch. 7, pp. 267–319, 1997.

Zyskind et al., "Erbium–Doped Fiber Amplifiers for Optical Communications," Optical Fiber Telecommunications, Ch. 2, pp. 13–69, 1997.

Yariv, "Optical Electronics in Modern Communications," Detection of Optical Radiation, Ch. 11, pp. 413–473. No date available.

Masuda et al., "Ultra–wideband optical amplification with 3dB bandwidth of 65nm using a gain–equalised two–stage erbium–doped fibre amplifier and Raman amplification," Electronics Letters, vol. 33, No. 9, pp. 73–78. Feb. 24, 1997.

Nissov et al., "100 Gb/s (10x10Gb/s) WDM Transmission Over 7200 km Using Distributed Raman Amplification," pp. 9–12. No date available.

Tonguz et al., "Gain Equalization of EDFA Cascades," Journal of Lightwave Technology, vol. 15, No. 10, pp. 1832–1841, Oct. 1997.

Wysocki et al., "Broad–Band Erbium–Doped Fiber Amplifier Flattened Beyond 40 nm Using Long–Period Grating Filter," IEEE Photonics Technology Letters, vol. 9, No. 10, pp. 1343–1345, Oct. 10, 1997.

Sun et al., "80nm ultra–wideband erbium–doped silica fibre amplifier," Electronics Letters vol. 33, No. 23, pp. 1965–1967, Nov. 6, 1997.

Hansen et al., "Rayleigh Scattering Limitations in Distributed Raman Pre–Amplifiers," IEEE Photonics Technology Letters, vol. 10, No. 1, pp. 159–161, Jan. 1998.

Hansen et al.; "Loss compensation in dispersion compensating fiber modules by Raman amlification," Optical Fiber Conference OFC'98, Technical Digest TuD1, pp. 20–21, Feb. 1998.

Rottwitt et al., "A 92nm Bandwidth Raman Amplifier," paper PD–6, pp. 1–4, No date available.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Dianov et al., "Highly efficient 1.3$\mu$m Raman fiber amplifier," Electronics Letters, vol. 34, No. 7, 2 pages, Apr. 2, 1998.

Ma et al., "240–km Repeater Spacing in a 5280–km WDM System Experiment Using 8 x 2.5 Gb/s NRZ Trnasmission," IEEE Photonics Technology Letters, vol. 10, No. 6, pp. 893–895, Jun. 1998.

Srivastava et al., "High–speed WDM Transmission in All–Wave™ Fiber in Both the 1.4$\mu$m and 1.55 $\mu$m Bands," paper PD–2–5, Vail, Co, No date available.

Emori et al., "Less than 4.7 dB Noise Figure Broadband In–line EDFA with A Raman Amplified–1300 ps/nm DCF Pumped by Multi–channel WDM Laser Diodes," PD3–1–5, No date available.

Forghieri et al., "Simple Model of Optical Amplifier Chains to Evaluate Penalities in WDM Systems," Journal of Lightwave Technology, vol. 16, No. 9, pp. 1570–1576, Sep. 1998.

Chernikov et al., "Broadband Silica Fibre Raman Amplifiers at 1.3 $\mu$m and 1.5$\mu$m," ECOC, pp. 49–50, Sep. 20–24, 1998.

Letellier et al., "Access to Transmission Performance Margins Through Pre–emphasis Adjustment in WDM Systems," ECOC, pp. 175–276, Sep. 20–24, 1998.

Rotwitt et al., "Distributed Raman Amplifiers for Long Haul Transmission Systems," IEEE, pp. 251–252, 1998.

Becker et al., "Erbium Doped Fiber Amplifiers Fundamentals and Technology," Academic Press, pp. 55–60 plus title and copyright page, 1999.

Kidorf et al., Pump Interactions in a 100–nm Bandwidth Raman Amplifier, IEEE Photonics Technology Letters, vol. 11, No. 5, pp. 530–532, May 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual–wavelengh–pumped silica–fibre Raman amplifiers," Electronics Letters, vol. 35, No. 14, pp. 1178–1179, Jul. 8, 1999.

Suzuki et al., "50 GHz spaced, 32 x 10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Yun et al., "Dynamic Erbium–Doped Fiber Amplifier Based on Active Gain Flattening with Fiber Acoutooptic Tunable Filters," IEEE Photonics Technology Letters, vol. 11, No. 10, pp. 1229–1231, Oct. 1999.

Manna et al., "Modeling of Penalities on Chains of Optical Amplifiers with Equalizing Filters," Journal of Lightwave Technology, vol. 18, No. 3, pp. 295–300, Mar. 2000.

Nielsen et al., "3.28 Tb/s (82/spl times 40 Gb/s) transmission over 3/spl times 100 km nonzero–dispersion fiber using dual C—and L–band hybrid Raman/erbium–doped inline amplifiers," OFCC 2000, pp. 236–138 plus internet title page, Mar. 7–10, 2000.

Koch et al., "Broadband gain flattened Raman Amplifier to extend operation in the third telecommunication window," FF3–1–3, pp. 103–105, No date available.

Emori et al., "Cost–effective depolarized diode pump unit designed for C–band flat–gain Raman amplifiers to control EDFA gain profile," FF4–1–3, pp. 106–108, No date available.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Mar. 2001.

Seo et al., "Simultaneous Amplification and Channel Equalization Using Raman Amplifier for 30 Channels in 1.3–$\mu$m Band," Journal of Lightwave Technology, vol. 19, No. 3 pp. 391–397, Mar. 2001.

Optical Society of America, Optical Amplifiers and Their Applications, Technical Digest, entitled "Raman amplification and dispersion–managed solitons for all–optical, ultra–long–haul, dense WDM, " Jul. 1–4, 2001.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Scheerer et al., "SRS crosstalk in preemphasized WDM Systems," pp. WM28–1/293–WM28–3/295, No date available.

Pending Patent Application; USSN 09/811,067, entitled "Method and System for Reducing Degradation of Optical Signal to Noise Ratio," by Michel W. Chbat et al, Filed Mar. 16, 2001.

Pending Patent Application; USSN 09/811,103; entitled "System and Method for Wide Band Raman Amplification," by Mohammed N. Islam et al, Filed Mar. 16, 2001.

Pending Patent Application; USSN 10/211,209; entitled "Active Gain Equalization," by Mohammed N. Islam et al, Filed Aug. 2, 2002.

Pending Patent Application; USSN 09/971,436; entitled "High Reliability Optical Amplification," by Mohammed N. Islam et al, Filed Oct. 5, 2001.

Pending Patent Application; USSN 10/028,576; entitled "Optical Amplification Using Launched Signal Powers Selected as a Function of a Noise Figure," pp. 1–77, by Mohammed N. Islam et al, Filed Dec. 20, 2001.

Pending Patent Application, USSN 90/768,367, entitled "All Band Amplifier," by Mohammed N. Islam, Filed Jan. 22, 2001.

Pending Patent Application; USSN 09/766,489; entitled "Nonlinear Polarization Amplifiers in Nonzero Dispersion Shifted Fiber," by Mohammed N. Islam, Filed Jan. 19, 2001.

Pending Patent Application; USSN 09/800,805; entitled "Dispersion Compensating Nonlinear Polarization Amplifiers," by Mohammed N. Islam, Filed Mar. 5, 2001.

Pending Patent Application; WO 99/66607; entitled "Dispersion Compensating and Amplifying Optical Element, Method for Minimizing Gain Tilt, and Apparatus for Minimizing Non–Linear Interaction between Band Pumps," by Mohammed N. Islam et al, Filed Jun. 16, 1999.

Pending Patent Application; USSN 09/765,972; entitled "S+ Band Nonlinear Polarization Amplifiers," by Mohammed N. Islam, Filed Jan. 19, 2001.

Pending Patent Application; USSN 10/003,199; entitled "Broadband Amplifier and Communication System," by Mohammed N. Islam, Filed Oct. 30, 2001.

Pending Patent Application; USSN 10/007,643; entitled "Multi–Stage Optical Amplifier and Broadband Communication System," by Mohammed Islam, Filed Nov. 6, 2001.

Pending Patent Application; USSN 10/005,472; entitled "Multi–Stage Optical Amplifier and Broadband Communication System," by Mohammed Islam, Filed Nov. 6, 2001.

Pending Patent Application; USSN 10/014,839; entitled "Multi–Stage Optical Amplifier and Broadband Communication System," by Mohammed N. Islam, Filed Dec. 10, 2001.

Pending Patent Application; USSN 09/990,142; entitled "Broadband Amplifier and Communication System," by Mohammed N. Islam, Filed Nov. 20, 2001.

Pending Patent Application; USSN 10/100,591; entitled "System and Method for Managing System Margin," by Mohammed N. Islam et al. , Filed Mar. 15, 2002.

Pending Patent Application; USSN 10/100,587; entitled "Fiber Optic Transmission System with Low Cost Transmitter Compensation," by Mohammed N. Islam, Filed Mar. 15, 2002.

Pending Patent Application; USSN 10/116,487; entitled "Fiber Optic Transmission System for a Metropolitan Area Network," by Mohammed N. Islam, Filed Apr. 3, 2002.

Pending Patent Application; USSN 10/100,700; entitled "Rack System for an End Terminal in an Optical Communication Network," by Mohammed N. Islam et al., Filed Mar. 15, 2002.

Hiroji Masuda and Shingo Kawal, Ultra Wide–Band Raman Amplification With A Total Gain–Bandwidth of 132 nm Of Two Gain–Bands Around 1.5 $\mu$m, ECOC '99, Nice, France, pp. II–146–13 11–147, Sep. 26–30, 1999.

Sugizaki, et al., Slope Compensating DVF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53, 2001.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59, 2001.

H.A. Haus, "Optimum Noise Performance of Optical Amplifiers," IEEE Journal of Quantum Electronics, Vol. 37, No. 6, 11 pages Jun. 2001.

PCT, Notification of Transmittal of the International Search Report or Declaration, 6 pages Jan. 14, 2003.

* cited by examiner

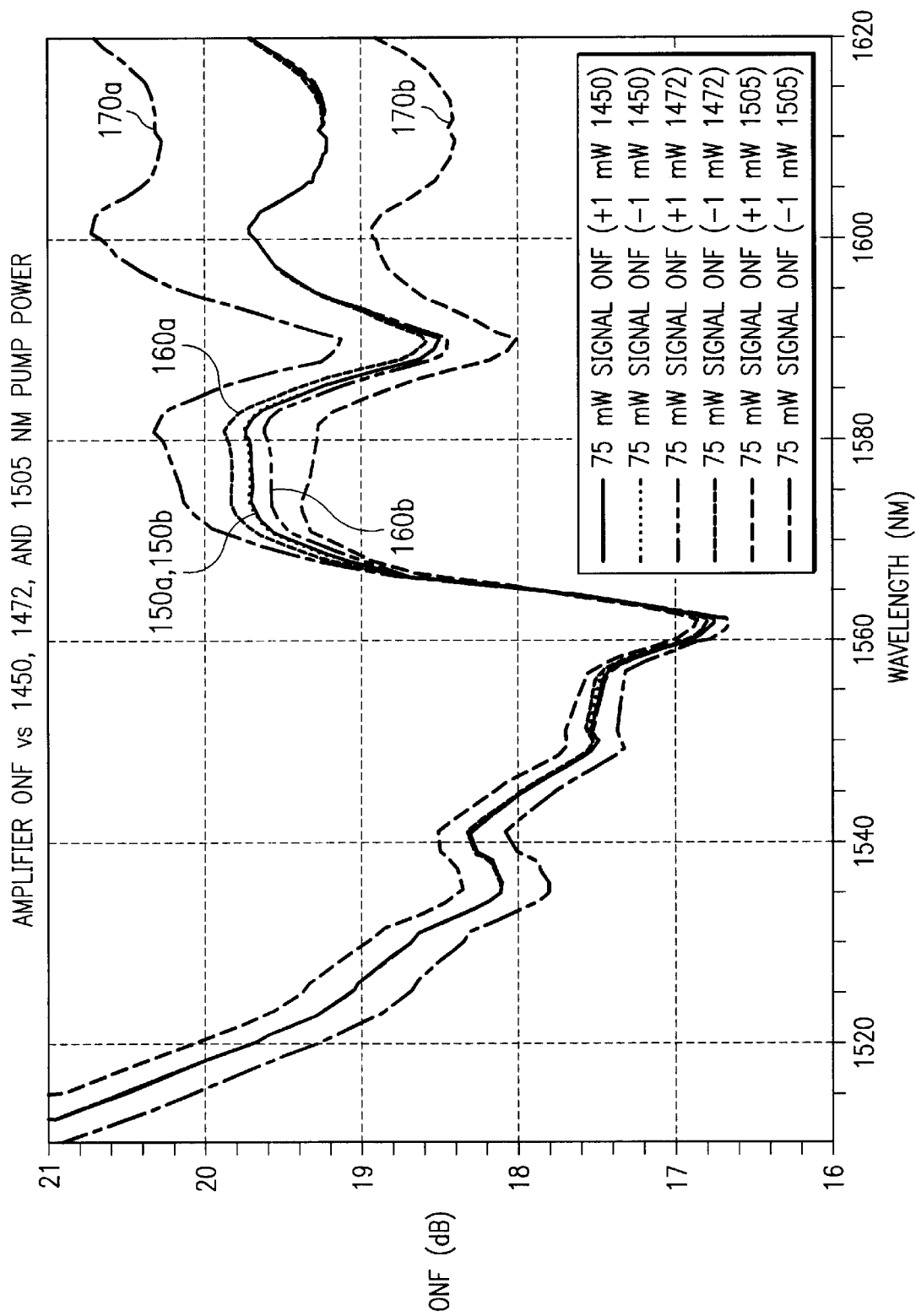

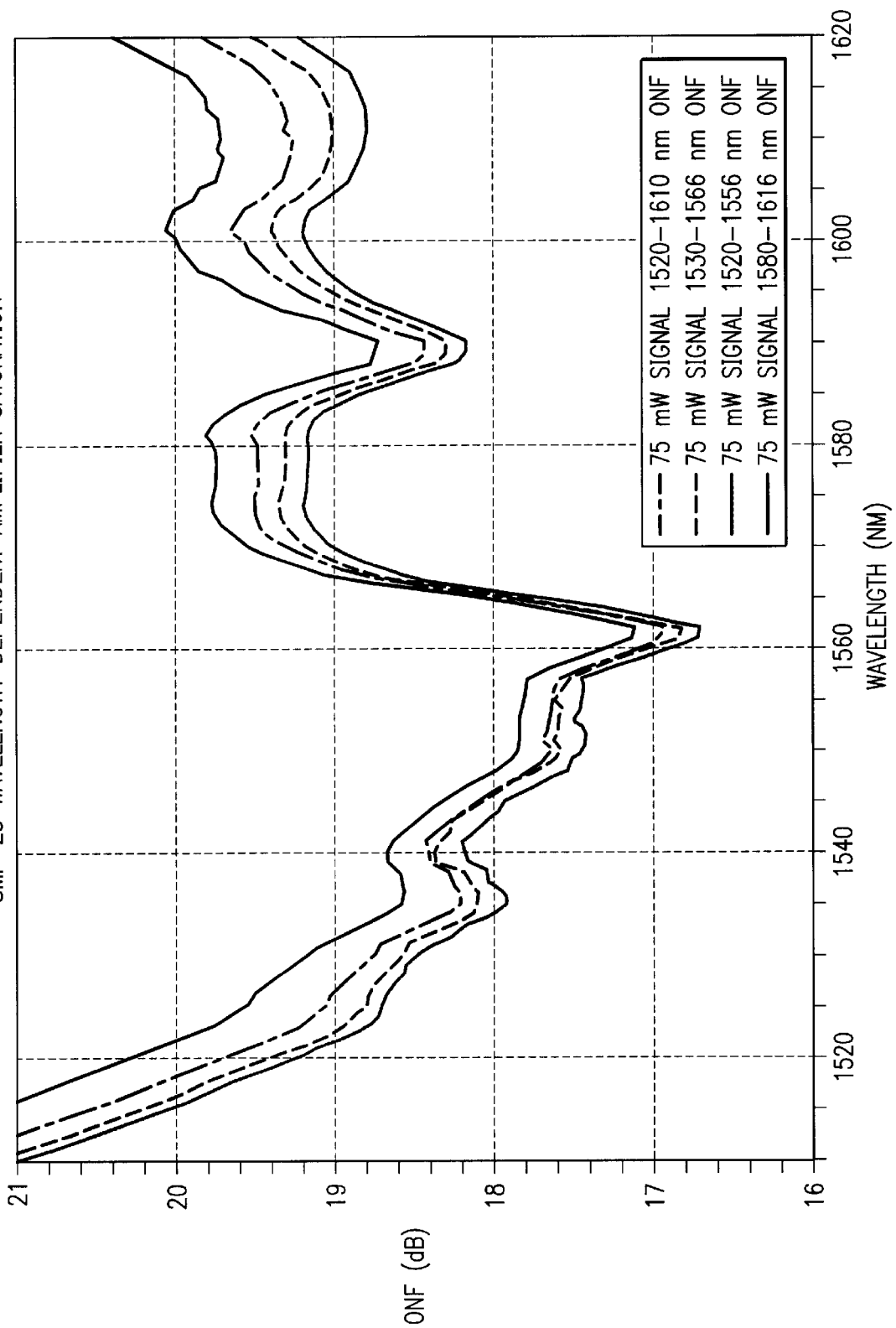

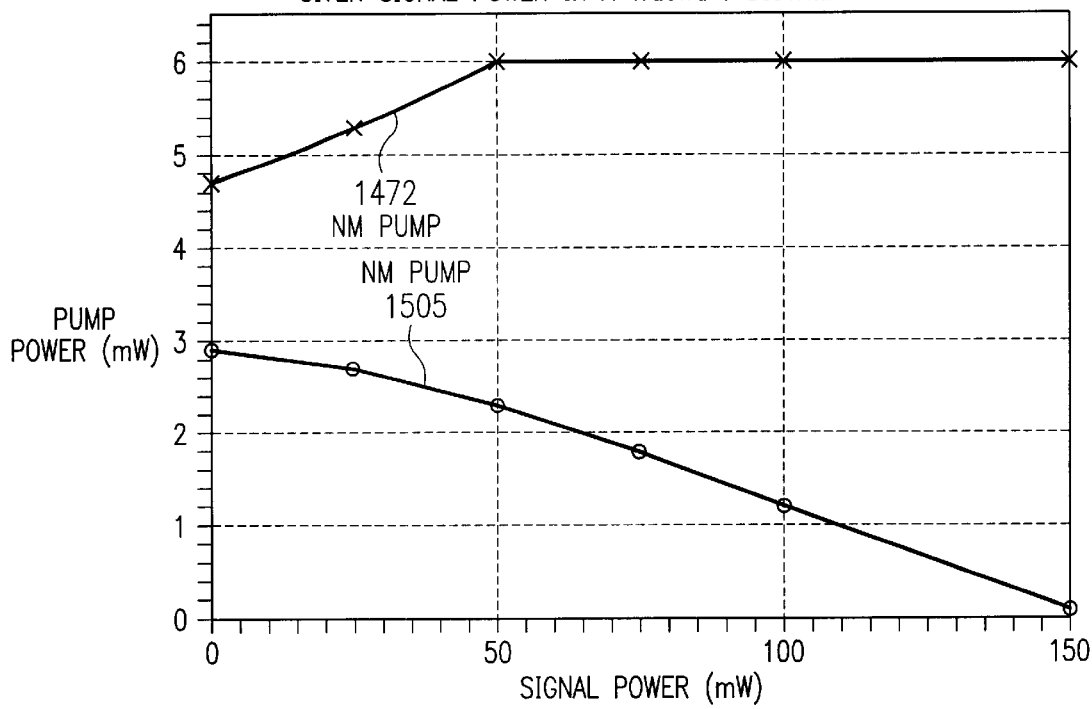
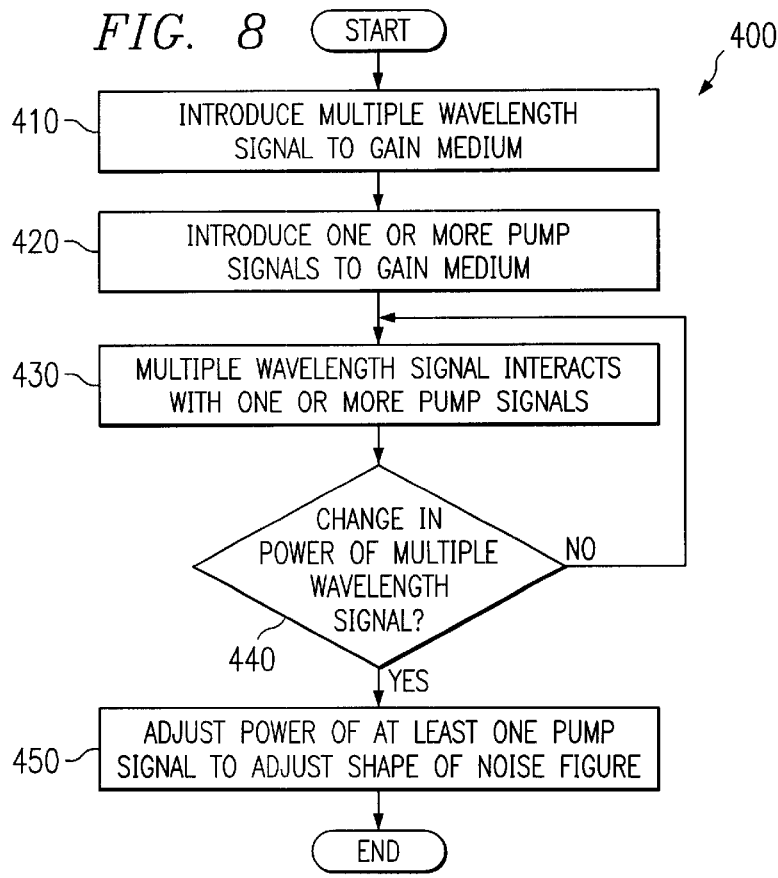

SYSTEM AND METHOD FOR CONTROLLING NOISE FIGURE

TECHNICAL FIELD OF THE INVENTION

The present invention relates generally to the field of communication systems, and more particularly to a system and method operable to facilitate controlling the shape of a noise figure generated in an optical amplifier.

BACKGROUND

Optical amplifiers generate noise through a variety of phenomena, such as when signals being amplified interact with one another and when signals being amplified interact with pump signals associated with the amplifier. Different levels of noise can be created at different wavelengths along the spectrum of wavelengths being amplified. This leads to a spectrum of noise created across the wavelengths of the amplified signals.

Although optimization techniques can be developed to counter the effects of noise generated by a particular source, the effectiveness of these techniques can deteriorate where the shape of the noise figure changes over time. Existing optimization techniques are generally not equipped to respond to phenomena that tend to change the shape of the noise figure of the amplifier.

OVERVIEW

The present invention recognizes a need for a method and apparatus operable to facilitate control of a noise figure generated in an optical amplifier. In accordance with the present invention, a system and method for controlling a noise figure reduces or eliminates at least some of the shortcomings associated with previous communication systems.

In one aspect of the invention, an optical amplifier operable to amplify a plurality of optical wavelength signals at least in part through Raman amplification comprises an input operable to receive a plurality of wavelength signals and an output operable to communicate an amplified version of at least some of the plurality of wavelength signals. The amplifier further comprises a pump assembly operable to generate one or more pump signals and a gain medium operable to receive the plurality of wavelength signals and the one or more pump signals and to facilitate amplification of at least some of the plurality of wavelength signals. The amplifier has associated with it a noise figure having a shape varying as a function of wavelength. At least one of the one or more pump signals is operable to have its power varied to selectively control the shape of the noise figure.

In another aspect of the invention, a multi-stage amplifier comprises a first amplifier stage comprising a Raman amplification stage operable to amplify a plurality of wavelength signals through interaction with one or more pump signals and a second amplifier stage operable to further amplify at least some of the plurality of wavelength signals. The power of at least one of the one or more pump signals in the first stage is operable to be varied in response to a change in power of the plurality of wavelength signals, the variation in pump power selectively controlling the shape of a noise figure of the amplifier during operation of the amplifier.

In yet another aspect of the invention, an optical amplifier operable to amplify a plurality of optical wavelength signals at least in part through Raman amplification comprises an input operable to receive a plurality of wavelength signals and a pump assembly operable to generate one or more pump signals operable to interact with one or more of the wavelength signals over a gain medium to cause Raman amplification of the one or more wavelength signals. The amplifier also comprises control circuitry operable to generate a control signal based at least in part on a signal proportional to the total power of the plurality of wavelength signals. The amplifier is operable to vary the power of at least one of the one or more pump signals in response to the control signal, the variation of the power of the at least one pump signal selectively controlling the shape of a noise figure associated with wavelength signals being amplified.

In still another aspect of the invention, a method of amplifying a plurality of wavelength signals comprises amplifying a plurality of wavelength signals and adding wavelength signals to or dropping wavelength signals from the plurality of wavelength signals. The method further comprises selectively controlling the shape of the noise figure as wavelength signals are added or dropped from the plurality of wavelength signals.

In another aspect of the invention, a method of amplifying optical signals comprises introducing to a gain medium one or more pump signals and a multiple wavelength signal comprising a plurality of wavelength signals and detecting a change in power of the multiple wavelength signal. The method also comprises adjusting a power of at least one of the one or more pump signals in response to the change in power of the multiple wavelength signal to result in selectively controlling the shape of a noise figure associated with the multiple wavelength signal.

In another aspect of the invention, an optical communication system operable to facilitate communication of multiple signal wavelengths comprises one or more transmitters operable to generate alone or collectively a plurality of signal wavelengths and a multiplexer operable to combine the plurality of signal wavelengths into a single multiple wavelength signal for transmission over a transmission medium. The system further comprises a plurality of optical amplifiers operable to receive the plurality of signal wavelengths. At least one of the optical amplifiers comprises a gain medium operable to amplify the multiple wavelength signal through interaction with one or more pump signals, the amplification occurring prior to, during, or after the multiple wavelength signal's transmission over the transmission medium. The power of at least one of the one or more pump signals is operable to be varied in response to a change in power of the plurality of wavelength signals, the variation in pump power selectively controlling the shape of a noise figure of the amplifier during operation of the amplifier.

Depending on the specific features implemented, particular embodiments of the present invention may exhibit some, none, or all of the following technical advantages. For example, various embodiments of the invention facilitate enhanced amplifier operation by controlling the shape of a noise figure associated with all or a portion of a spectrum of amplified signals.

One aspect recognizes that it would be desirable to maintain the shape of the noise figure in an optical communication system despite changes to the system, such as variations in signal power due to, for example, wavelength signals being added to or dropped from a multiple wavelength signal. This would allow, for example, existing optimization algorithms to continue to be utilized. In addition, in some cases, the peak increase in the noise figure can be lessened by approximately maintaining the shape of the noise figure when system conditions change. Moreover, selectively controlling the shape of the noise figure can reduce or eliminate the need to monitor and adjust individual wavelength signal powers when other wavelength signal powers change.

In at least some embodiments, the shape of a noise figure of an optical amplifier can be effectively modified or maintained by altering the powers of one or more pump wavelengths, in particular pump signals at longer wavelengths. In particular embodiments, all or a majority of the shaping of the noise figure can be accomplished in a first stage of a multiple stage amplifier.

Another aspect recognizes that control signals operable to affect the shape of the noise figure can be generated based at least in part on the total power of the signals being amplified. Although the invention could equally apply to approaches using more complex spectrum analyzing techniques to ascertain a control signal, using total power to determine a control signal provides a simple and cost effective mechanism for controlling noise figure shape. In addition, the relationship between total signal power and adjustments in amplifier pump power to control noise figure shape allows for use of look-up tables or simple algorithms to determine a control signal.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 is a graphical illustration of a relationship between pump power levels and an optical noise figure for a given signal power;

FIG. 6 is a graph illustrating noise figure shapes resulting from applying a fixed input signal power at various locations along a spectrum of amplified signals according to the teachings of the present invention;

FIGS. 7a–7c are graphs illustrating example pump powers applied in response to various levels of signal power, resulting in approximately maintaining the shape of the optical noise figure for the amplifier as the signal power varies, according to the teachings of the present invention; and FIG. 8 is a flowchart illustrating one example of a method of amplifying optical signals.

DETAILED DESCRIPTION OF EXAMPLE EMBODIMENTS

Figure 1:
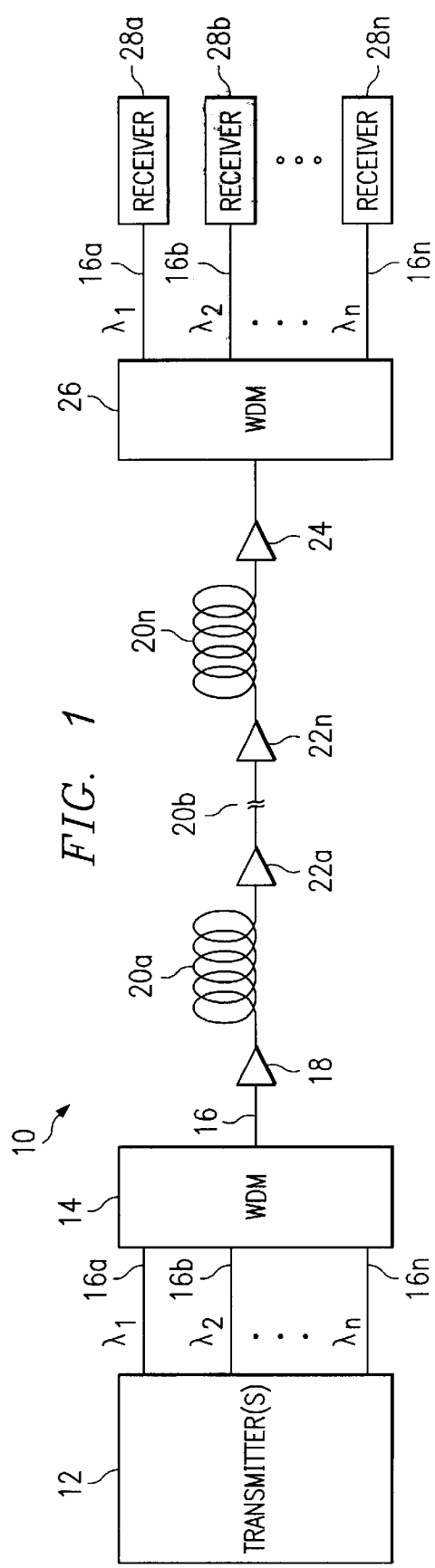
FIG. 1 is a block diagram showing an exemplary optical communication system operable to facilitate communication of a plurality of wavelength signals according to the teachings of the present invention.

FIG. 1 is a block diagram showing an exemplary optical communication system 10 operable to facilitate communication of a plurality of wavelength signals. System 10 includes a transmitter bank 12 operable to generate a plurality of wavelength signals 16a–16n. Each wavelength signal 16a–16n comprises at least one wavelength or band of wavelengths of light that are substantially different from wavelengths carried by other wavelength signals 16a–16n.

Transmitter bank 12 may include, for example, one or more optical transmitters operable to generate alone or in combination a plurality of wavelength signals 16. In one embodiment, each one of the plurality of transmitters is operable to generate one optical signal having at least one wavelength that is substantially different from wavelengths generated by other transmitters 12. Alternatively, a single transmitter 12 operable to generate a plurality of wavelength signals could be implemented.

System 10 also includes a combiner 14 operable to receive multiple signal wavelengths 16a–16n and to combine those signal wavelengths into a single multiple wavelength signal 16. As one particular example, combiner 14 could comprise a wavelength division multiplexer (WDM). The term wavelength division multiplexer as used herein may include conventional wavelength division multiplexers or dense wavelength division multiplexers.

In one particular embodiment, system 10 may include a booster amplifier 18 operable to receive and amplify wavelengths of signal 16a prior to communication over a transmission medium 20. Transmission medium 20 can comprise multiple spans 20a–20n of fiber. As particular examples, fiber spans 20 could comprise standard single mode fiber (SMF), dispersion-shifted fiber (DSF), non-zero dispersion-shifted fiber (NZDSF), or other fiber type or combinations of fiber types.

Where communication system 10 includes a plurality of fiber spans 20a–20n, system 10 can include one or more in-line amplifiers 22a–22n. In-line amplifiers 22 reside between fiber spans 20 and operate to amplify signal 16 as it traverses fiber 20.

Optical communication system 10 can also include a preamplifier 24 operable to receive signal 16 from a final fiber span 20n and to amplify signal 16 prior to passing that signal to a separator 26. Separator 26 may comprise, for example, a wavelength division demultiplexer (WDM), which can operate on wavelength division multiplexed signals or dense wavelength division multiplexed signals. Separator 26 operates to separate individual wavelength signals 16a–16n from multiple wavelength signal 16. Separator 26 can communicate individual signal wavelength 16a–16n to a bank of receivers 28 and/or other optical communication paths.

Particular optimization techniques can be developed to contend with a specific identified noise sources. The difference (in decibels) between the signal-to-noise ratio (SNR) at the input to the amplifier or amplifier stage and the SNR at an output to the amplifier or amplifier stage is referred to as a noise figure. The shape and magnitude of a noise figure can vary over time and/or according to the source of the noise. For example, the noise figure can change when additional channels are communicated through the system, increasing the aggregate power of the signals being transmitted. Variances in the noise figure can lessen the effectiveness of optimization techniques developed to address a different noise figure spectrum.

One aspect of system 10 recognizes that it would be desirable to maintain the shape of the noise figure in an optical communication system despite changes to the system, such as variations in signal power. This would allow, for example, existing optimization algorithms to continue to be utilized. In addition, in some cases, the peak increase in the noise figure can be lessened by approximately maintaining the shape of the noise figure when system conditions change. Furthermore, maintaining the shape of the noise figure reduces or eliminates the need to monitor and adjust individual wavelength signal powers when other wavelength signal powers change. In this manner, for example, signal-to-noise ratios across the spectrum of amplified wavelengths can be approximately maintained without implementing separate control loops for each signal wavelength.

One way to facilitate this feature is to implement at least one amplification stage in at least one amplifier of system 10 that is operable to perform Raman amplification by introducing to a nonlinear medium signals 16 along with one or more pump signals having various wavelengths. One or more longer wavelength pump signals can be selectively adjusted in power to at least partially control the shape of a noise figure associated with signals 16 being amplified. Throughout this document, the term "longer wavelength pump signal" refers to a pump signal comprising a wavelength that is longer than the wavelengths of at least half of the other pump signals.

In one particular embodiment, the power(s) of one or more longer wavelength pump signals are selectively adjusted in the first amplification stage of a multiple-stage amplifier to result in at least a majority of the shaping of the noise figure being performed in the first amplification stage.

In some cases, the power(s) of one or more longer wavelength pump signals can be adjusted by monitoring the total power of wavelength signals 16 and generating one or more control signals based at least in part on the total power of wavelength signals 16. The control signal(s) can be used to adjust, for example, a current driving the particular one or more pumps, thereby adjusting the power of the pump or pumps.

One aspect of the present invention recognizes that the shape of a noise figure of an optical amplifier can be effectively modified or maintained by altering the powers of one or more pump wavelengths, in particular pump signals at longer wavelengths.

FIG. 2 is a graphical illustration showing how changing pump powers of various wavelengths affect the shape of a noise figure. FIG. 2 shows that changes to the power of longer wavelength pump signals have a greater effect, both in magnitude and over a larger bandwidth, than changing the pump power of shorter pump wavelengths.

In FIG. 2, each noise FIGS. 150a–b, 160a–b, and 170a–b represents an optical noise figure of one particular embodiment of amplifier 100 after varying pump signals at 1450, 1472, and 1505 nanometers, respectively. In this example, the nominal pump powers applied at 1450, 1472, and 1505 nanometers are: 150 milli-Watts, 6.0 milli-Watts, and 1.79 milli-Watts respectively. The graph shows the resulting noise figures when the nominal pump powers are increased and decreased by 1 milli-Watt.

Noise FIGS. 150a, 160a, and 170a show noise figures after pump powers are decreased from their initial powers by 1 milli-Watt. Noise FIGS. 150b, 160b, and 170b show noise figures after the same pumps signals are increased in power by 1 milli-Watt from their initial powers. In each case, the input signal power remains consistent at 75 milli-Watts.

As depicted in FIG. 2, the shape of noise FIGS. 150a and 150b associated with a pump signal at 1450 nanometers exhibits a relatively small change when the applied pump power changes. In contrast, the shape of noise FIGS. 170a and 170b associated with a longer wavelength pump signal at 1505 nanometers exhibits a much larger change when the applied pump power changes by the same amount.

Figure 3A:
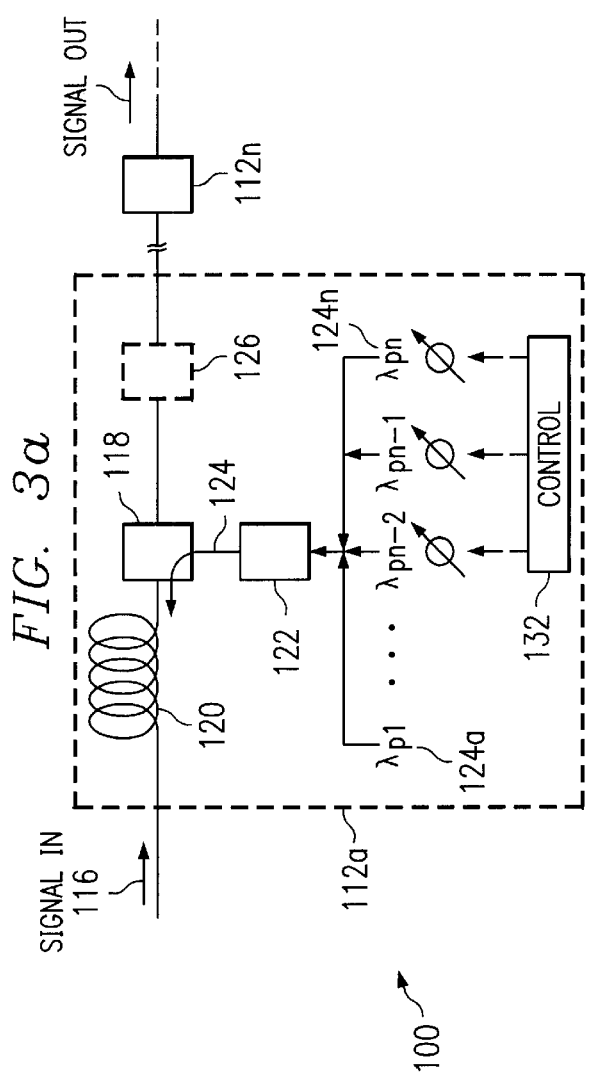
FIGS. 3a–3c are block diagrams of at least portions of exemplary embodiments of optical amplifiers constructed according to the teachings of the present invention.

FIG. 3a is a block diagram of at least a portion of an exemplary embodiment of an optical amplifier 100. Amplifier 100 comprises at least a first stage 112a comprising a Raman amplification stage. In this example, amplifier 100 further comprises a second stage 112n. Second amplification stage 112n could comprise another Raman amplification stage, or may comprise, for example, a rare-earth doped amplification stage or other amplifier type. Amplifier 100 could comprise a distributed Raman amplifier, a discrete Raman amplifier, or a hybrid amplifier comprising stages of Raman amplification and stages of, for example, rare-earth doped amplification.

System 10 is not limited to a particular number of amplifier stages. For example, amplifier 100 could comprise a single stage amplifier. Alternatively, additional amplification stages could be cascaded after second stage 112n, before stage 112a, or between first stage 112a and second stage 112n.

In this example, first stage 112a of amplifier 100 includes an input operable to receive a multiple wavelength optical input signal 116. First stage 112a also includes a gain medium 120. Depending on the type of amplifier being implemented, medium 120 may comprise, for example, a transmission fiber or a gain fiber such as a spooled gain fiber. In a particular embodiment, medium 120 may comprise a dispersion compensating fiber.

First stage 112a further includes a pump assembly 122. Pump assembly 122 generates a plurality of pump signals 124a–124n (referred to collectively as pump signals 124) at specified wavelengths. Pump assembly 122 may comprise, for example, a single pump operable to generate multiple pump signals 124a–124n at various wavelengths, or may comprise a plurality of pumps, each operable to generate one or more of the pump signals 124a–124n. In a particular embodiment, pump assembly 122 could comprise a polarization multiplexed pump. Although the illustrated embodiment shows the use of counter propagating pumps, co-propagating pumps or a combination of co-propagating and counter-propagating pumps could also be used without departing from the scope of the invention.

The power of one or more pump signals 124 can be selectively altered. In this particular example, one or more control signals 132 operate to facilitate selective adjustment of the power of one or more pump signals 124. In one embodiment, control signal(s) 132 can operate to adjust the current supplied to pump assembly 122, thereby regulating the power produced by one or more pump signals.

As described with respect to FIG. 2, one aspect of the invention recognizes that adjusting the power of longer wavelength pump signals tends to have a greater effect on the shape of the noise figure than adjusting the power of shorter wavelength pump signals. When seeking to modify or maintain the shape of the noise figure in light of changing signal conditions, therefore, it may be desirable to focus on adjusting the power of longer wavelength pump signals.

Amplifier 100 includes a coupler 118, which couples pump wavelengths 124 to gain medium 120. Coupler 118 could comprise, for example, a wave division multiplexer (WDM) or an optical coupler.

In the illustrated embodiment, one or more lossy elements 126 can optionally reside between first amplifier stage 112a and one or more of subsequent amplification stages 112b–112n. Lossy element 126 could comprise, for example, an isolator, an optical add/drop multiplexer, an optical cross-connect, or a gain equalizer facilitating mid-stage access to the amplifier.

In operation, at first amplification stage 112a, gain medium 120 receives a plurality of wavelength signals and facilitates propagating those signals toward coupler 118. Coupler 118 facilitates communicating pump signals 124 and wavelength signals 116 over gain medium 120. Raman gain results from the interaction of intense light from the pumps with the signals 116 and optical phonons in gain medium 120. The Raman effect leads to a transfer of energy from one optical beam (the pump) to another optical beam (the signal). As conditions change, such as when the power of one or more of wavelength signals 116 changes, or where the aggregate power of the multiple wavelength signal changes, for example, when individual wavelength signals are added or dropped, control signal(s) 132 is applied to pump assembly 122 to approximately maintain the shape of the noise figure associated with the signals being amplified.

Figure 3B:
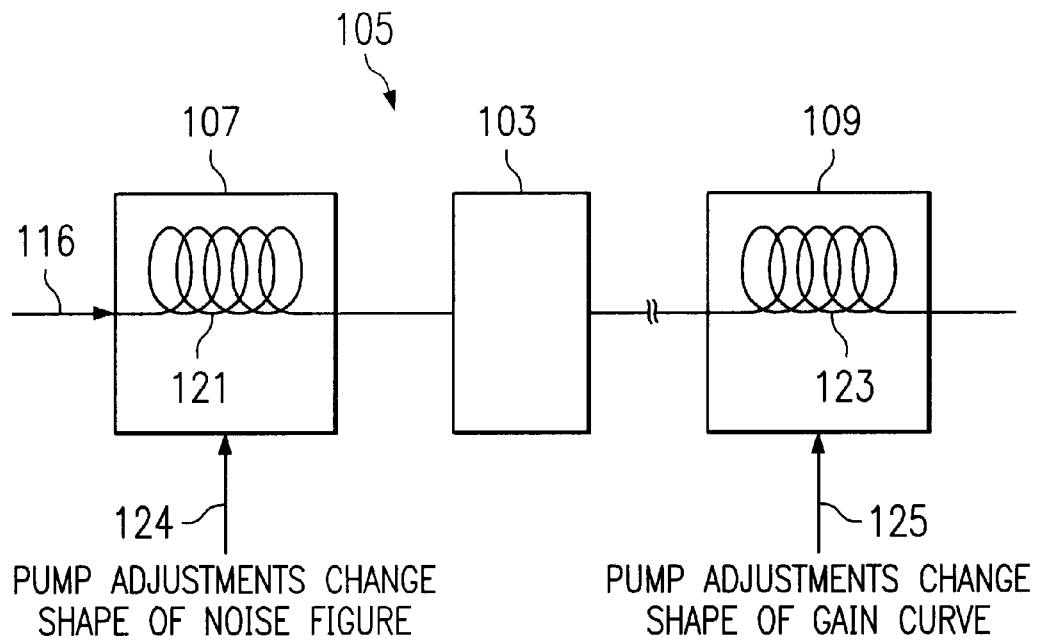

FIG. 3b is a block diagram showing one particular example of a multiple stage amplifier 105 operable to control noise figure shape and gain shape. Amplifier 105 includes a first stage 107 and a second stage 109. First stage 107 includes a Raman gain medium 121 operable to receive a multiple wavelength signal 116 and one or more pump signals 124. The power of one or more of pump signals 124 is varied to adjust the shape of the noise figure associated with amplification stage 107.

Second stage 109 includes an amplification medium 123 operable to receive multiple wavelength signal 116 and one or more pump signals. Gain medium 123 may comprise a Raman gain medium or a rare-earth doped gain medium. Gain medium 123 also receives pump signals 125. One or more pump signals 125 are adjusted to adjust or flatten the gain of amplifier stage 109, and/or the entire amplifier assembly 105. A gain flattening filter could alternatively be used to flatten the gain of amplifier stage 109 and/or amplifier assembly 105.

Figure 3C:
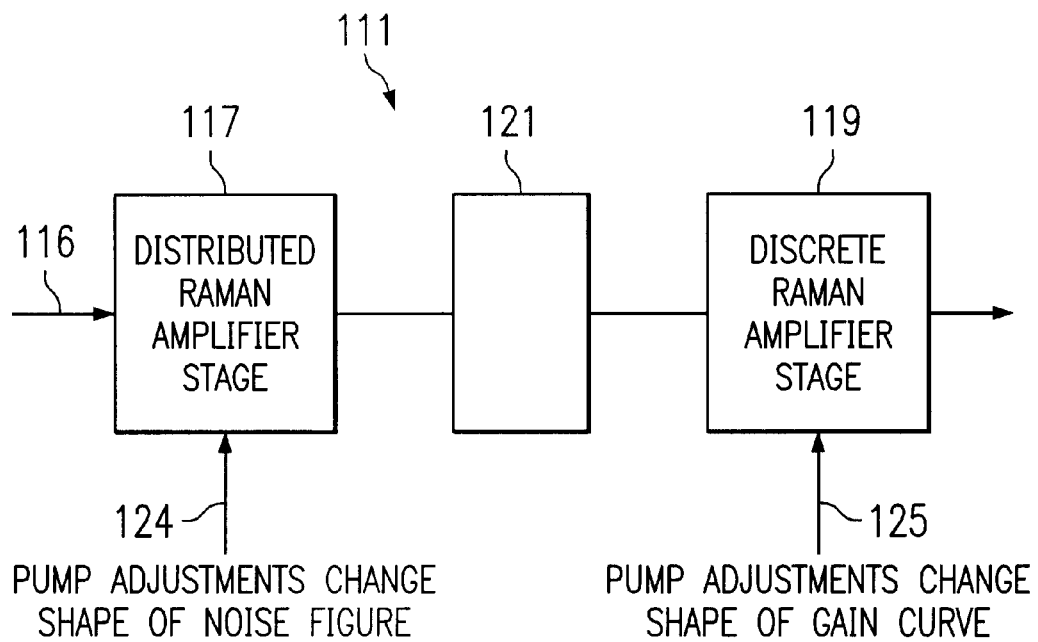

FIG. 3c is a block diagram showing another embodiment of a multiple stage amplifier 111 operable to adjust the shape of a noise figure. Amplifier 111 comprises a first stage 117 comprising a distributed Raman amplification stage and a second stage 119 comprising a discrete Raman amplification stage. The powers of one or more pump signals 123 and/or 125 can be adjusted to modify the shape of a noise figure associated with amplification stages 117 and/or 119, or amplifier assembly 111. A lossy element 121, such as an optical isolator can be coupled between stages of amplifier 111. Lossy element 121 can facilitate, for example, mid-stage access to amplifier 111.

Figure 4A:
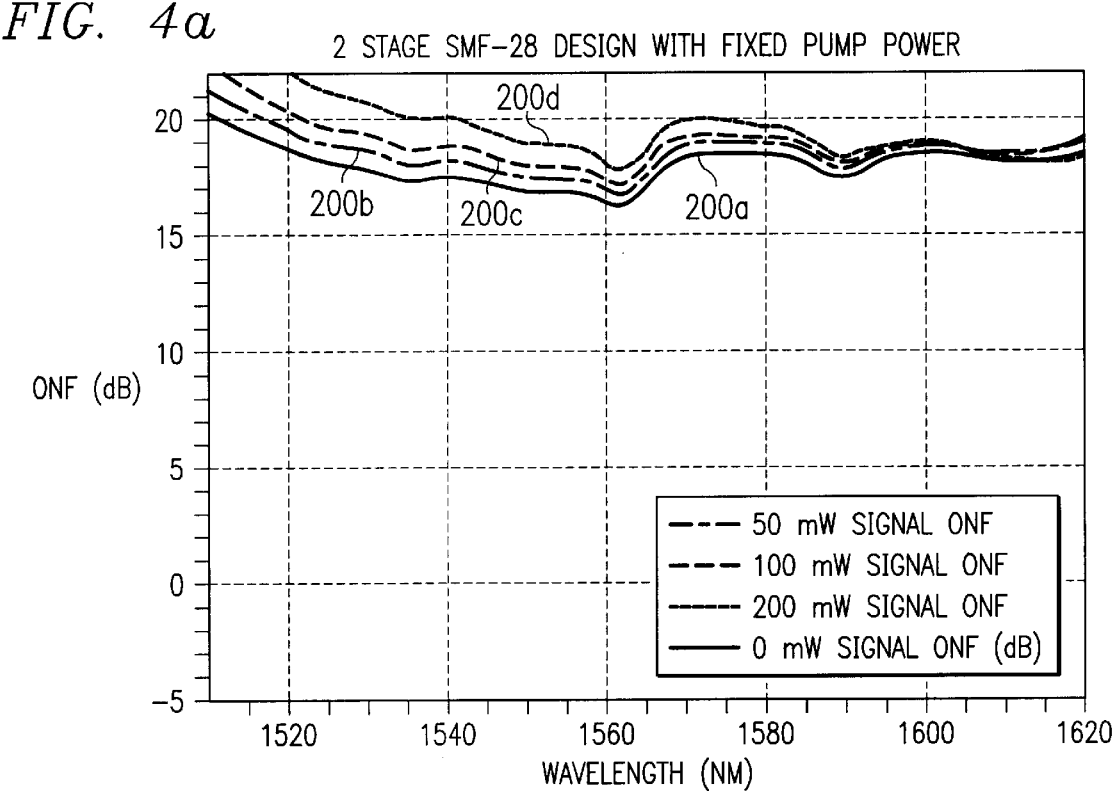
FIGS. 4a–4f show exemplary noise figures for various embodiments of optical amplifiers under various operating conditions.

FIG. 4a shows exemplary noise figures for amplifier 100 applying various levels of input signal power while the powers of pump signals 124 remain approximately constant. In this example, wavelength signals range in wavelength from 1520 nanometers to 1610 nanometers. Noise FIGS. 200a–200d represent noise figures for total input signal powers of 0.0 milli-Watts, 50 milli-Watts; 100 milli-Watts; and 200 milli-Watts; respectively.

In this example, amplifier 100 comprises a two stage Raman amplifier. First stage 112a utilizes approximately eighty kilometers of SMF-28 fiber as a gain medium and six pump signals 124. Second stage 112n utilizes a length of dispersion compensating fiber, such as DK-30 available from Lucent Technologies, and two pump signals. The powers and spectral locations of the pump signals in the first stage, for all input signal power levels, are as follows:

438 milli-Watts at 1396 nanometers;
438 milli-Watts at 1416 nanometers;
438 milli-Watts at 1427 nanometers;
254 milli-Watts at 1450 nanometers;
15 milli-Watts at 1472 nanometers;
10 milli-Watts at 1505 nanometers.

These values, including the location, number, and powers for each pump signal, are given for illustrative purposes only and are not intended to limit the scope of the invention. As depicted in FIG. 4a, as the signal power increases from a nominal value (noise FIG. 200a) to a value of 200 milli-Watts (noise FIG. 200d), the shape of the noise figure changes, resulting in a generally steeper sloped noise figure as the signal power increases. As a result, optimization schemes developed for use with noise FIG. 200a can become less effective, or even unusable as the signal power level increases. In addition, the peak noise level increases as signal power increases.

Figure 4B:
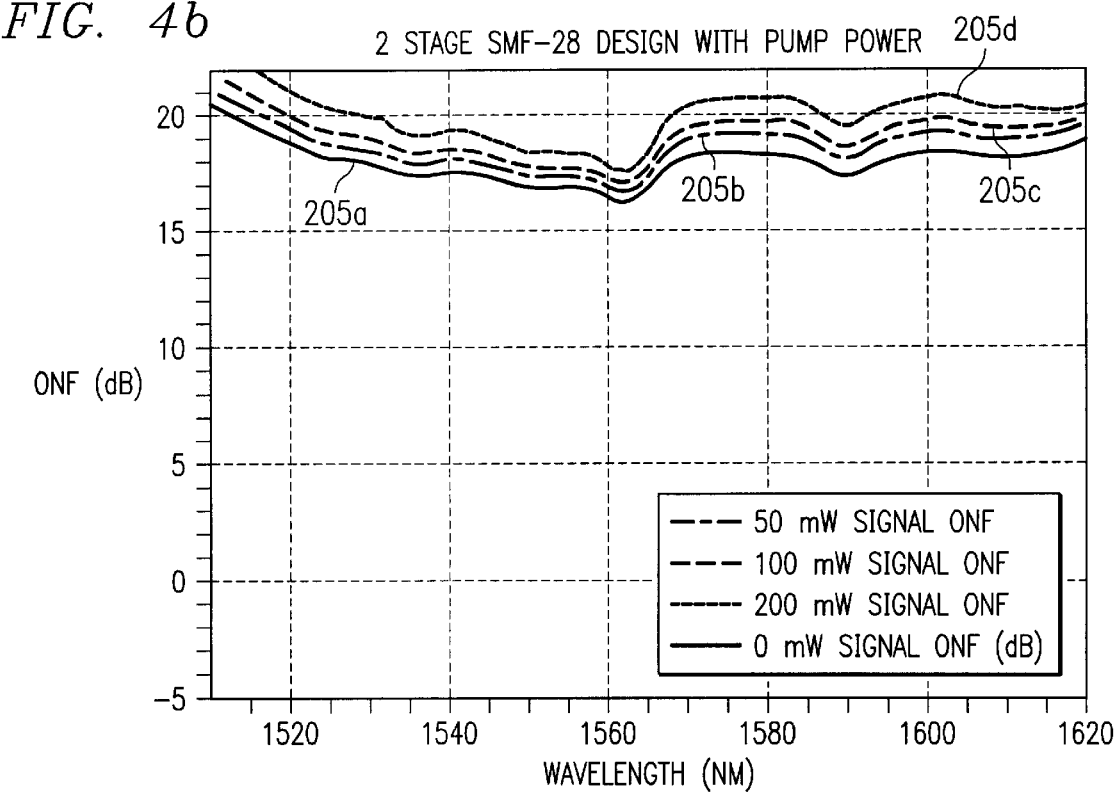

FIG. 4b shows exemplary noise figures for the same amplifier 100 when applying various levels of input signal power. In this case, however, the longest wavelength pump signal is modified to result in approximately maintaining the shape of the noise figure. In this example, the longest wavelength pump signal (1505 nanometers) power level was modified as the input signal power changed as follows:

10 milli-Watts for signal power=0 milli-Watts;
8 milli-Watts for signal power=50 milli-Watts;
6 milli-Watts for signal power=100 milli-Watts;
2 milli-Watts for signal power=200 milli-Watts.

Again, the spectral location and power of the pump signal being modified are given for illustrative purposes only. In this example, as depicted in FIG. 4b, modifying the power of a longer wavelength pump signal, in this case the longest wavelength pump signal, as the power of input signals 116 increases can result in approximately maintaining the shape of the noise figure for the amplifier or for a particular amplifier stage. As a result, optimization techniques developed for one noise figure can continue to be applied despite changes in system characteristics, such as input signal power, that would otherwise significantly change the shape of the noise figure. In addition, FIG. 4b shows that adjusting the power of one or more of the longer wavelength pump signals can result in reducing the increase in the peak noise figure compared to approaches leaving all pump powers constant. Moreover, using this technique, the relative signal-to-noise ratio for each individual wavelength signal can be approximately maintained without requiring a feedback loop for each wavelength.

As an additional feature, the embodiment depicted in FIG. 3 implements a gain flattening technique to achieve a more uniform gain spectrum. In particular, the pump signals in second amplification stage 112n have been selected to increase the flatness of the gain curve. In this example, pump signals of 380 milli-Watts are applied at 1472 nanometers and 1505 nanometers, respectively, in second stage 112n. This embodiment illustrates selection of pump power levels in an early amplification stage to address modifications of the shape of the noise figure, and modification of the power of those pump signals in a later stage of the amplifier to address flattening of the amplifier gain spectrum. Of course, other gain flattening techniques, such as use of a gain flattening filter could alternatively be used to achieve similar results.

Figure 4C:
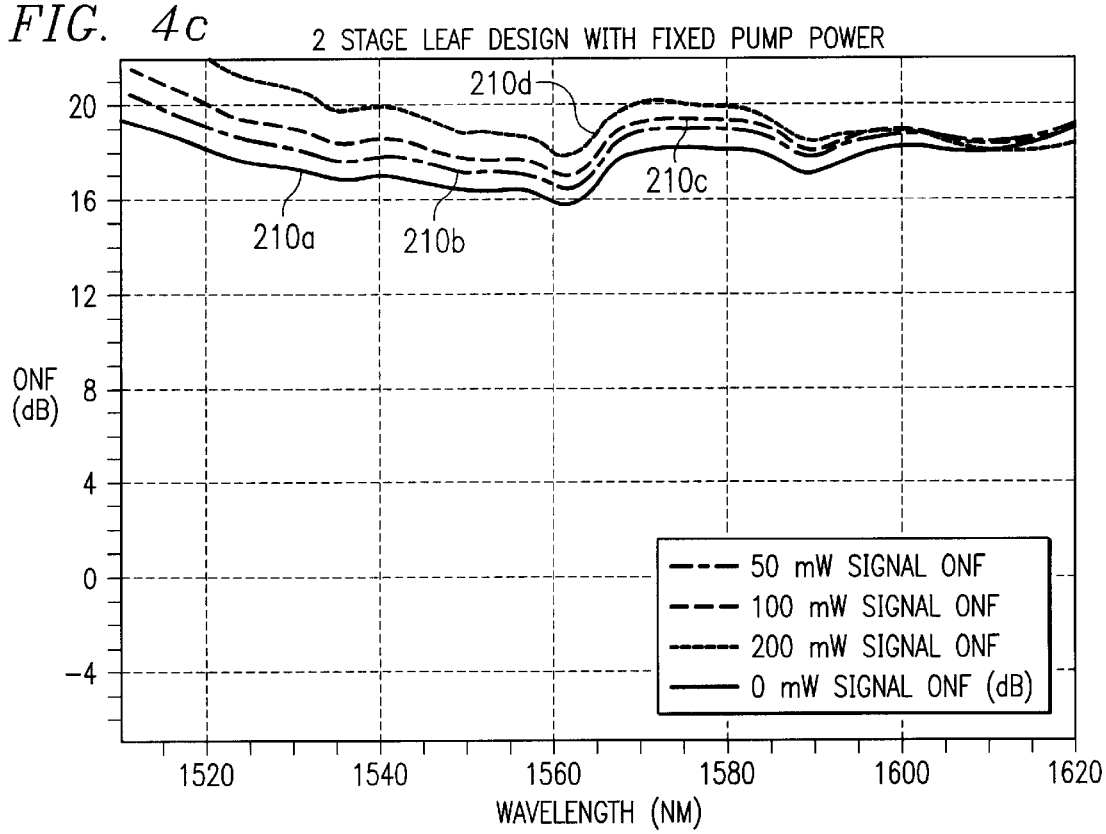
Figure 4D:
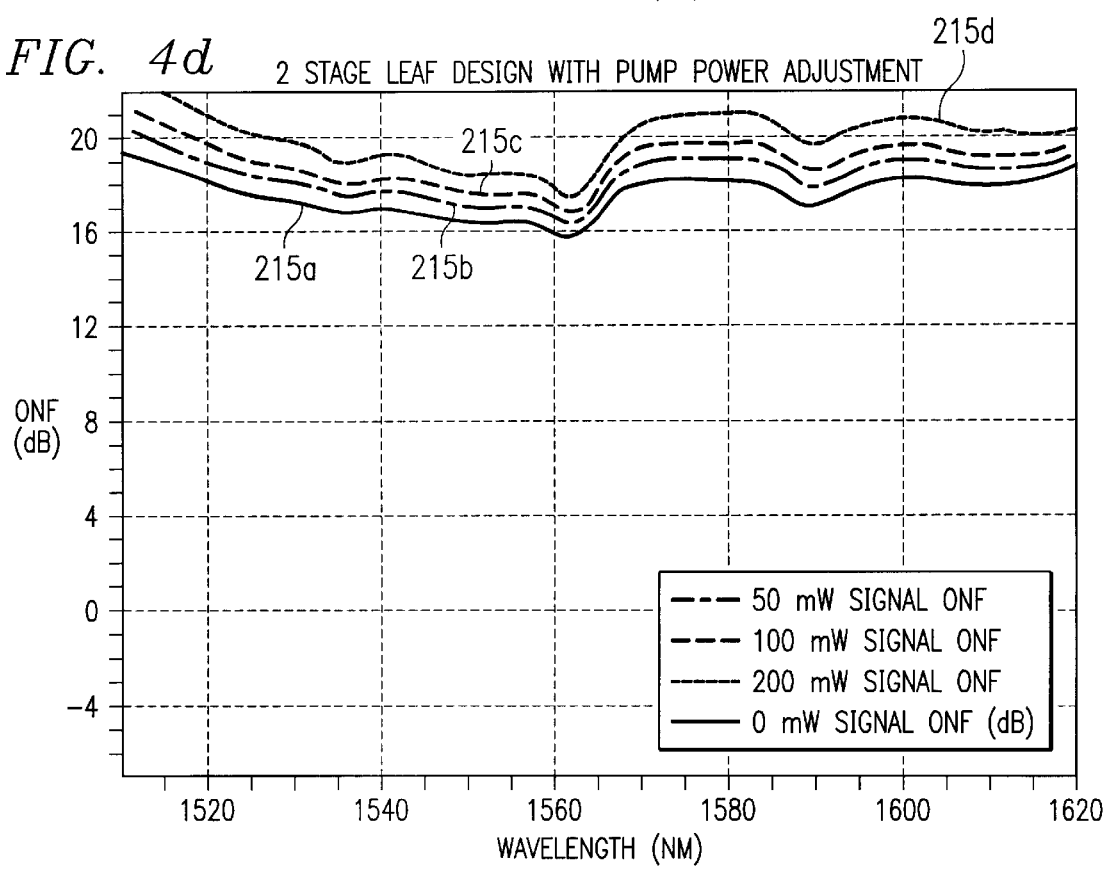

FIGS. 4c and 4d are graphs illustrating noise figures for uncompensated and compensated operation, respectively, of another embodiment of amplifier 100. In this example, wavelength signals range in wavelength from 1520 nanometers to 1610 nanometers. Noise FIGS. 210*a*–210*d* represent noise figures for total input signal powers of 0.0 milli-Watts, 50 milli-Watts; 100 milli-Watts; and 200 milli-Watts; respectively.

In this embodiment, amplifier 100 comprises a two stage Raman amplifier. The gain medium in the first amplification stage comprises approximately 80 kilometers of LEAF™ Raman gain fiber. The second stage comprises a dispersion compensating fiber, such as DK-30 fiber available from Lucent Technologies.

The powers and spectral locations of the pump signals in the first stage of this example, for all input signal power levels, are as follows:

438 milli-Watts at 1396 nanometers;
438 milli-Watts at 1416 nanometers;
438 milli-Watts at 1427 nanometers;
200 milli-Watts at 1450 nanometers;
8 milli-Watts at 1472 nanometers;
4.5 milli-Watts at 1505 nanometers.

Again, these values, including the location, number and powers for each pump signal, are given for illustrative purposes only and are not intended to limit the scope of the invention. As depicted in FIG. 4*c*, as the signal power increases from a nominal value (noise FIG. 210*a*) to a value of 200 milli-Watts (noise FIG. 210*d*), the shape of the noise figure changes, resulting in a generally steeper sloped noise figure as the signal power increases. In addition, the peak noise level increases as signal power increases.

FIG. 4*d* shows exemplary noise figures for the same amplifier 100 when applying various levels of input signal power, while modifying a longer wavelength pump signal to result in approximately maintaining the shape of the noise figure. In this example, the longest wavelength pump signal (1505 nanometers) power level was modified as the input signal power changed as follows:

4.5 milli-Watts for signal power=0 milli-Watts;
3.8 milli-Watts for signal power=50 milli-Watts;
2.9 milli-Watts for signal power=100 milli-Watts;
0.5 milli-Watts for signal power=200 milli-Watts.

Again, the spectral location and power of the pump signal being modified are given for illustrative purposes only. In this example, as depicted in FIG. 4*d*, decreasing the power of the longest wavelength pump signal 324 as the power of input signals 116 increases results in approximately maintaining the shape of the noise figure for the amplifier or for a particular amplifier stage.

Figure 4E:
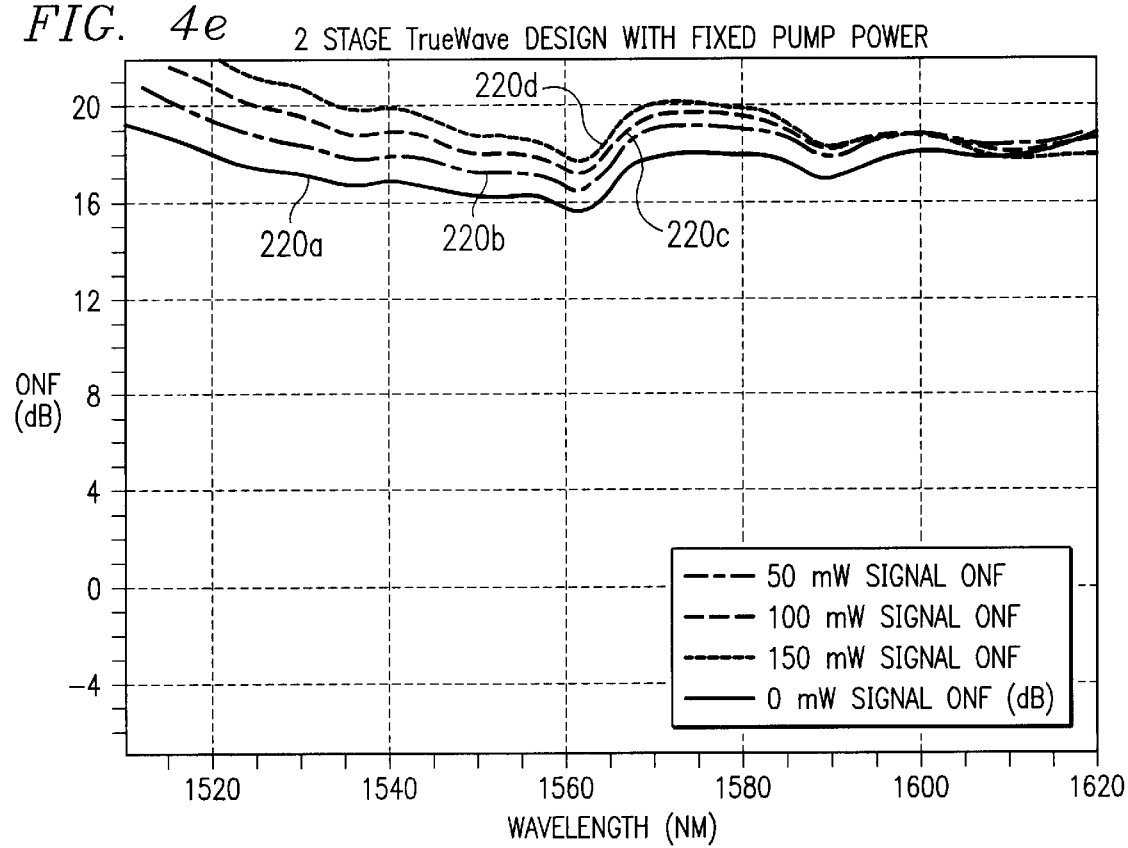
Figure 4F:
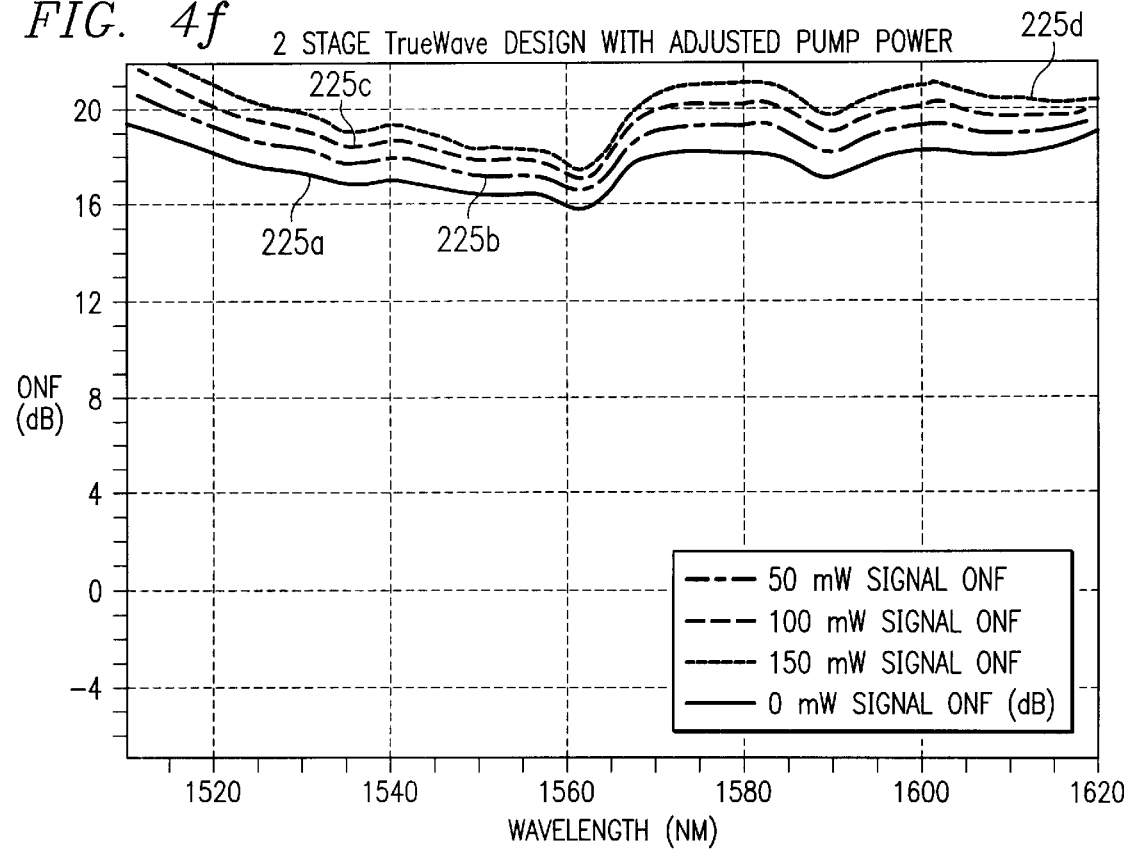

The concept of utilizing adjustments to longer wavelength pump signals to approximately maintain the shape of the noise figure is not limited to making adjustments to just one pump wavelength. FIGS. 4*e* and 4*f* are graphs illustrating noise figures for uncompensated and compensated operation, respectively, of still another embodiment of amplifier 100. In this example, wavelength signals ranged in wavelength from 1520 nanometers to 1610 nanometers. Noise FIGS. 220*a*–220*d* represent noise figures for total input signal powers of 0.0 milli-Watts, 50 milli-Watts; 100 milli-Watts; and 150 milli-Watts; respectively.

In this embodiment, amplifier 100 comprises a two stage Raman amplifier, where the first stage implements an approximately 80 kilometer length of TRUEWAVE™ Raman fiber. The second stage uses a dispersion compensating fiber, such as a DK-30 fiber available from Lucent Technologies. The powers and spectral locations of the pump signals in the first stage of this example, for all input signal power levels, are as follows:

320 milli-Watts at 1396 nanometers;
320 milli-Watts at 1416 nanometers;
320 milli-Watts at 1427 nanometers;
150 milli-Watts at 1450 nanometers;
4.7 milli-Watts at 1472 nanometers;
2.9 milli-Watts at 1505 nanometers.

As depicted in FIG. 4*e*, as the signal power increases from a nominal value (noise FIG. 220*a*) to a value of 150 milli-Watts (noise FIG. 220*d*), the shape of the noise figure changes, resulting in a generally steeper sloped noise figure as the signal power increases. In addition, the peak noise level increases as signal power increases.

FIG. 4*f* shows exemplary noise figures for the same amplifier 100 when applying various levels of input signal power, while adjusting the longest two wavelength pump signals. In this example, the power of the longest wavelength pump signal (1505 nanometers) was modified as the input signal power changed as follows:

2.9 milli-Watts for signal power=0 milli-Watts;
2.3 milli-Watts for signal power=50 milli-Watts;
1.2 milli-Watts for signal power=100 milli-Watts;
0.1 milli-Watts for signal power=150 milli-Watts.

In addition, the power level of the second-longest wavelength pump signal (in this case 1472 nanometers) was modified as the input signal power changed as follows:

4.7 milli-Watts for signal power=0 milli-Watts;
6.0 milli-Watts for signal power=50 milli-Watts;
6.0 milli-Watts for signal power=100 milli-Watts;
6.0 milli-Watts for signal power=150 milli-Watts.

Again, the spectral location and power of the pump signal being modified are given for illustrative purposes only. As depicted in FIG. 4*f*, decreasing the power of multiple longer wavelength pump signals 324 as the power of input signals 116 increases can result in approximately maintaining the shape of the noise figure for the amplifier or for a particular amplifier stage.

Figure 5A:
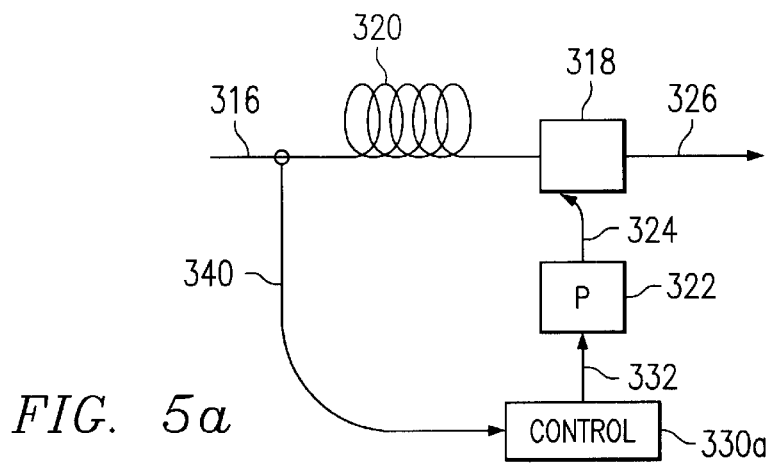
FIGS. 5a–5c are block diagrams illustrating various embodiments of control circuitry operable to generate control signals to modify the power of one or more pump signals according to the teachings of the present invention.
Figure 5B:
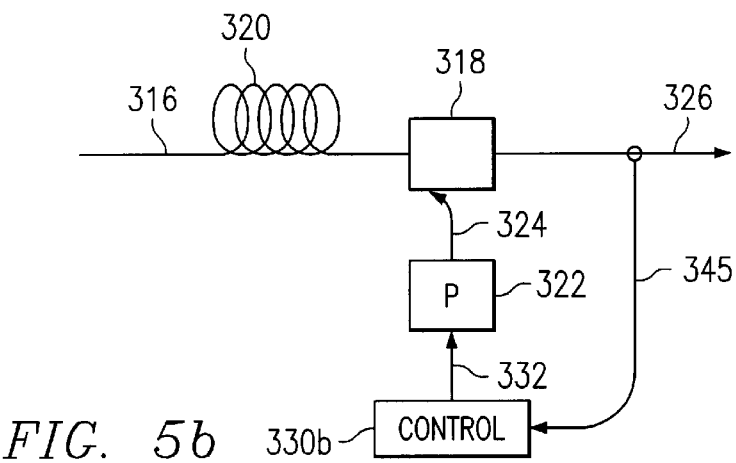
Figure 5C:
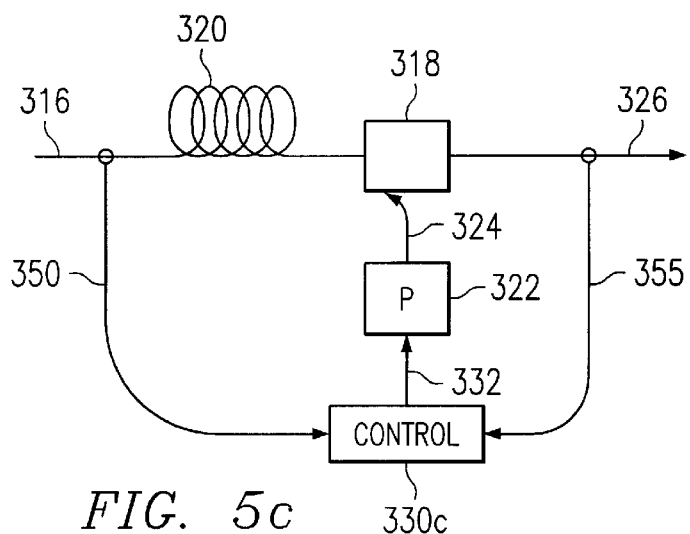

FIGS. 5*a*–5*c* are block diagrams illustrating various embodiments of control circuitry 330 operable to generate control signals 332 to modify the power of one or more pump signals 324. Each of FIGS. 5*a*–5*c* shows one stage of an optical amplifier including a gain medium 320 operable to receive a multiple wavelength signal 316. Gain medium 320 is coupled to a coupler 318, which facilitates introduction of pump signal 324 to gain medium 320. Wavelength signal 316 is amplified as one or more pump signals 324 interact with one or more wavelength signals of multiple wavelength 316 along gain medium 320. An amplified version 326 of wavelength signal 316 is output from the amplifier stage.

Each of the amplifiers in FIGS. 5*a*–5*c* includes control circuitry 330 operable to generate a control signal 332. Control signal 332 may, for example, adjust the current supplied to pump assemblies 322 for generating one or more pump signals 324. Control circuitry 330 may generate control signal 332 based on, for example, a signal proportional to the total input signal power of wavelength signal 316 as shown in FIG. 5*a*, based on a signal proportional to the total signal power of output signal 326 as shown in FIG. 5*b*, or based on a comparison of signals proportional to the total signal power of input wavelength signal 316 and output signal 326 as shown in FIG. 5*c*. Throughout this document, discussions of determining a control signal based on a total power of the optical signal are intended to encompass situations where a signal proportional to the total power of the optical signal is used to generate the control signal.

FIG. 6 is a graph illustrating noise figure shapes resulting from applying a fixed input signal power at various locations along a spectrum ranging from 1,520–1,620 nanometers. As shown in FIG. 6, although the magnitude of the noise figure may vary depending on the spectral location of the input signal power, in this embodiment the shape of the noise figure generally remains constant regardless of the spectral location of the signal power. One aspect of this invention recognizes that at least for embodiments similar to this one, when the shape of the noise figure does not significantly change depending on the spectral location of the input signal power, a control signal 322 can be generated by measuring the total signal power (for example, by using a signal proportional to the total signal power).

While more complex techniques such as implementing a spectrum analyzer to determine noise levels at particular wavelength ranges could be used without departing from the scope of the invention, using the total signal power to determine a control signal 332 provides advantages by reducing the cost and complexity of the system. Thus, signals 340 and 350 provide information regarding the total power of input signal 316, and signals 345 and 355 provide information regarding the total signal power of output signal 326.

Figure 7A:
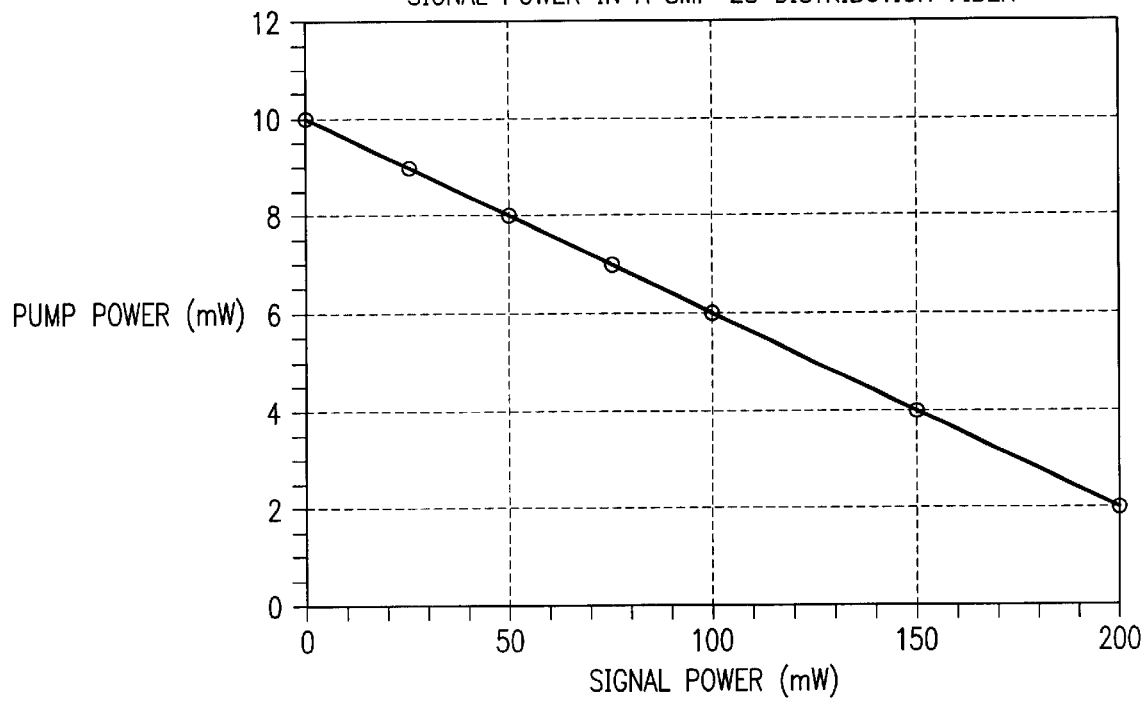
Figure 7B:
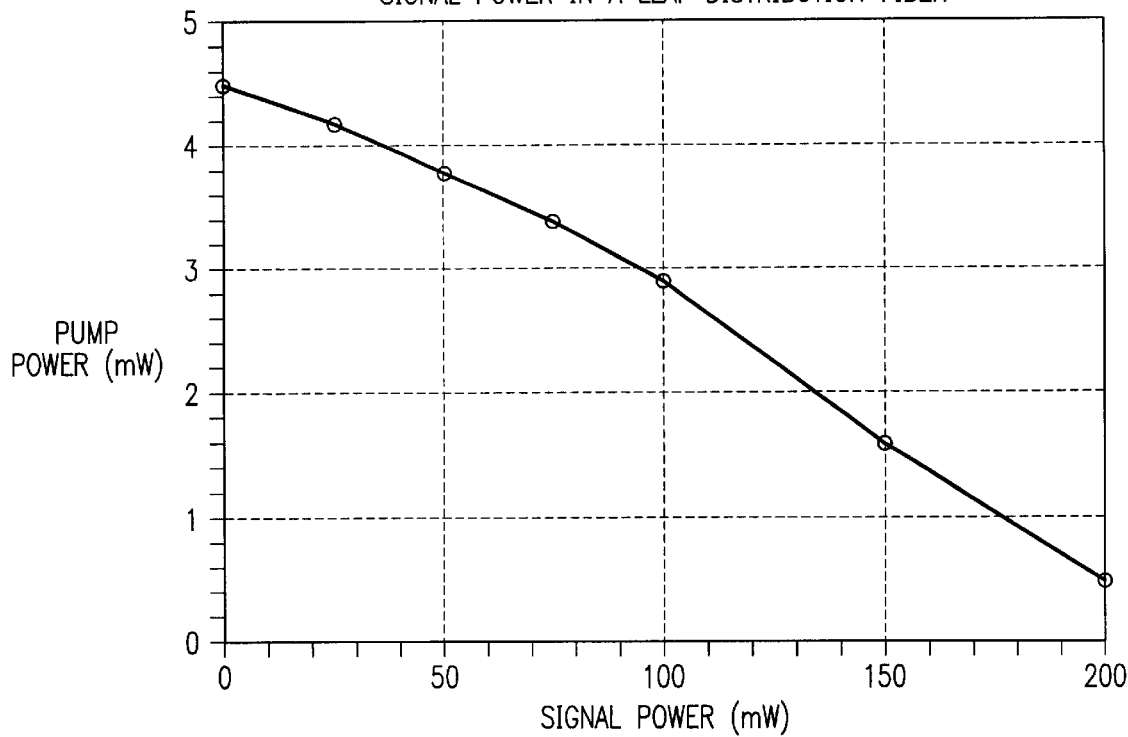

FIGS. 7a–7c are graphs illustrating example pump powers applied in response to various levels of signal power, resulting in approximately maintaining the shape of the optical noise figure for the amplifier as the signal power varies. FIG. 7a corresponds to the example discussed in FIG. 4b. FIG. 7b corresponds to the example discussed in FIG. 4d. FIG. 7c corresponds to the example discussed in FIG. 4f.

In these examples, ten signal wavelengths are applied over a range of 1,520–1,610 nanometers in Raman amplifier stages using various gain media. For example, FIG. 7a shows the results of a Raman amplifier stage using an SMF-28 distribution fiber as a gain medium. This figure illustrates changes in power to a pump signal at 1,505 nanometers that will achieve an approximately consistent shape of noise figure as signal powers vary from zero to 200 milli-watts.

The graph in FIG. 7b shows pump powers to be applied at 1,505 nanometers to achieve an approximately consistent noise figure shape for a Raman amplifier using a LEAF™ distribution fiber as a gain medium. FIG. 7c shows pump powers to be applied at 1,505 nanometers and 1,472 nanometers to achieve approximately consistent noise figure shapes for signal powers ranging from zero milli-watts to 150 milli-watts in a Raman amplifier using a TRUEWAVE™ distribution fiber as a gain medium.

As shown in FIGS. 7a–7c, one aspect of the present invention recognizes that adjustments to pump power for given changes in signal power can be nearly linear in nature. As a result, control circuitry 330 could comprise, for example, a look-up table or logic implementing an equation describing the relationship between changes in pump power and changes in signal power. Throughout this document, the term "logic" refers to any hardware, software, firmware, or combination thereof operable to execute one or more instructions, functions, processes, or routines to return on or more results.

For example, where control circuitry 330 comprises a look-up table, the table could be indexed according to signal powers 340 and/or 345 measured from input and output signals 316 and 326, respectively. For given signal powers, the look-up table of control circuitry 330 could index a value for control signal 332 resulting in a desired pump power. Likewise, where control circuitry 330 comprises logic implementing an equation describing the relationship between pump power and signal power, for given signal power applied to control circuitry 330, control circuitry 330 could generate control signal 332 directing pump 322 to produce pump signal 334 at a desired power level.

FIG. 8 is a flowchart illustrating one example of a method 400 of amplifying optical signals. This particular example will be discussed with respect to the embodiment described in FIG. 3 comprising a two-stage optical amplifier including at least a first stage operable to provide Raman amplification.

Method 400 begins at step 410 where amplifier 100 introduces a multiple wavelength signal 116 to gain medium 120. Multiple wavelength signal carries a plurality of individual wavelength signals. Gain medium 120, in this particular example, comprises a distributed Raman gain medium.

Amplifier 100 introduces one or more pump signals 324 to gain medium 120 at step 420. In this particular example, pump assembly 122 generates a plurality of pump signals 124a–124n, each having a wavelength distinct from wavelengths of other pump signals 124. Pump assembly 122 communicates pump signals 124 to a coupler 118, which facilitates propagation of pump signals 124 along gain medium 120 along with multiple wavelength signal 116. Pump signals 124 can co-propagate in the same direction as multiple wavelength signal 116, may counter-propagate in an opposite direction from multiple wavelength signal 116 over gain medium 120, or may include a combination of co-propagating and counter-propagating pump signals.

At least some wavelength signals of multiple wavelength signal 116 interact with at least some pump signals 124 at step 430 as those signals traverse gain medium 120. In this example, Raman gain results from interaction between pump signals 128, multiple wavelength signal 116, and optical phonons in silica fibers of gain medium 120. The Raman effect leads to a transfer of energy from pump signals 124 to wavelength signals of multiple wavelength signal 116.

Controller 132 monitors a characteristic, such as the power of multiple wavelength signal 116 at step 440. In a particular embodiment, controller 132 monitors the total signal power of wavelength signal 116. Control 132 may monitor the total signal power of signal 116 at various locations such as, the input to amplifier 100, or at a mid-stage point of amplifier 100. The total signal power can be approximated, for example, by tapping a portion of signal 116 to obtain a signal proportional to the total signal power.

In the event that a change in signal power is detected at step 140, controller 132 generates a control signal operable to adjust the power of at least one pump signal at step 450 to adjust the shape of a noise figure associated with multiple wavelength signal 116. A change in signal power could arise, for example, when powers of individual wavelength signals are varied, or when individual wavelength signals are added to or dropped from multiple wavelength signal 116.

In a particular embodiment, controller 132 adjusts the power of one or more longer wavelength pump signals 124. In one particular embodiment, controller 132 may adjust only the longest wavelength pump signal 124 to approximately maintain the shape of the noise figure under changing conditions of the multiple wavelength signal. All or most of the adjustment of the shape of the noise figure can occur, for example, in the first stage of a multiple stage amplifier.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical amplifier operable to amplify a plurality of optical wavelength signals at least in part through Raman amplification, the amplifier comprising an amplifier stage comprising:
   an input operable to receive a plurality of wavelength signals;
   an output operable to communicate at least some of the plurality of wavelength signals;
   a pump assembly operable to generate one or more pump signals; and
   a gain medium operable to receive the plurality of wavelength signals and the one or more pump signals and to facilitate amplification of at least some of the plurality of wavelength signals;
   wherein the amplifier stage has associated with it a noise figure having a shape varying as a function of wavelength and wherein at least one of the one or more pump signals is operable to have its power adjusted based at least in part on a signal power of one or more of the plurality of wavelength signals at an input to the gain medium of the amplifier stage to approximately maintain an intended shape of the noise figure.

2. The amplifier of claim 1, wherein the at least one of the one or more pump signals is operable to have its power adjusted to contribute to approximately maintaining the shape of the noise figure as the power of at least one of the plurality of optical wavelength signals varies pr wavelength signals are added to or dropped from the plurality of wavelength signals.

3. The amplifier of claim 1, wherein the at least one of the one of more pump signals comprises a pump signal having a longer wavelength than wavelengths of at least half of any remaining pump signals.

4. The amplifier of claim 1, wherein the at least one of the one of more pump signals comprises a pump signal having a longer wavelength than wavelengths of any remaining pump signals.

5. The amplifier of claim 1, wherein the at least one of the one or more pump signals comprises a plurality of pump signals each having a longer wavelength than wavelengths of at least half of any remaining pump signals.

6. The amplifier of claim 1, wherein the pump assembly comprises a plurality of pumps each operable to generate one of a plurality of pump signals.

7. The amplifier of claim 1, wherein the gain medium comprises a transmission fiber.

8. The amplifier of claim 1, wherein the gain medium comprises a Raman gain fiber.

9. The amplifier of claim 1, wherein the amplifier stage comprises a first stage of a multiple stage amplifier.

10. The amplifier of claim 9, wherein a majority of control of the characteristic of the noise figure occurs in the first amplifier stage.

11. The amplifier of claim 9, wherein a pump power in the first amplifier stage is adjusted to control the shape of the noise figure, and wherein a pump power in a second amplifier stage is adjusted to control the flatness of the gain of the wavelength signals.

12. The amplifier of claim 9, wherein a pump power in the first amplifier stage is adjusted to control the shape of the noise figure, and wherein a gain flattening filter is applied to control the flatness of the gain of the wavelength signals.

13. The amplifier of claim 1, wherein the amplifier comprises at least one distributed Raman amplification stage.

14. The amplifier of claim 1, wherein the amplifier comprises at least one discrete Raman amplification stage.

15. The amplifier of claim 1, wherein the amplifier comprises a multiple stage amplifier comprising:
   at least one stage comprising a distributed Raman amplifier; and
   at least one stage comprising a discrete Raman amplifier.

16. The amplifier of claim 1, wherein the amplifier comprises a multiple stage amplifier comprising:
   at least one stage of Raman amplification; and
   at least one stage of rare-earth doped amplification.

17. The amplifier of claim 1, wherein the amplifier comprises a multiple stage amplifier, comprising a lossy element coupled between two amplification stages.

18. The amplifier of claim 17, wherein the lossy element is selected from a group consisting of an optical add/drop multiplexer, an optical cross-connect, a gain equalizer, and an optical isolator.

19. The amplifier of claim 17, wherein the lossy element is operable to provide mid-stage access to the amplifier.

20. The optical amplifier of claim 1, wherein the at least one or more pump signals is operable to have its power adjusted based at least in part on signal power associated with one or more of the plurality of wavelength signals at an output to the amplifier stage to selectively control the characteristic of the noise figure.

21. The optical amplifier of claim 1, wherein the adjustment in pump power results in a change in magnitude of the nose figure.

22. The optical amplifier of claim 1, wherein the amplification of at least some of the plurality of wavelength signals results in a net gain to the at least some of the plurality of wavelength signals.

23. The optical amplifier of claim 1, wherein the signal power of the one or more of the plurality of wavelength signals is measured prior to or at the input to the gain medium.

24. An optical amplifier including an amplifier stage comprising:
   an input operable to receive a plurality of wavelength signals;
   an output operable to communicate at least some of the plurality of wavelength signals;
   wherein the amplifier stage has associated with it a noise figure having a shape varying as a function of wavelength; and
   means for approximately maintaining an intended shape of the noise figure as wavelength signals are added or dropped from the plurality of wavelength signals based at least in part on a signal power of one or more of the plurality of wavelength signals at the input to the amplifier stage.

25. The amplifier of claim 24, wherein the means for approximately maintaining an intended shape of the noise figure comprises a controller operable to generate a control signal operable to cause a change in a pump power of the amplifier.

26. The amplifier of claim 25, wherein the pump power drives a first amplification stage of a multiple stage amplifier.

27. The amplifier of claim 26, wherein the multiple stage amplifier comprises a discrete Raman amplification stage and a distributed Raman amplification stage.

28. The amplifier of claim 25, wherein the control signal is generated based at least in part on a total power of the plurality of wavelength signals.

29. The amplifier of claim 24, wherein the amplifier comprises at least one Raman amplification stage.

30. The optical amplifier of claim 24, wherein the adjustment in pump power results in a change in magnitude of the noise figure.

31. A multi-stage amplifier, comprising:
a first Raman amplifier stage operable to amplify a plurality of wavelength signals through interaction with one or more pump signals;
a second Raman amplifier stage operable to further amplify at least some of the plurality of wavelength signals;
wherein the power of a least one of the one or more pump signals in the first stage is operable to be adjusted in response to a change in power of the plurality of wavelength signals, the adjustment in pump power selectively controlling the shape of a noise figure of the amplifier to obtain an intended shape of the noise figure over the plurality of wavelength signals during operation of the amplifier.

32. The amplifier of claim 31, wherein the adjustment in pump power in the first stage is operable to approximately maintain the shape of a noise figure associated with the first stage as the power of one or more of the plurality of wavelength signals changes or wavelength signals are added to or dropped from the plurality of wavelength signals.

33. The amplifier of claim 31, wherein a majority of the control of the shape of the noise figure occurs in the first Raman amplifier stage.

34. The amplifier of claim 31, wherein substantially all of the control of the shape of the noise figure occurs in the first Raman amplifier stage.

35. The amplifier of claim 31, wherein the at least one of the one or more pump signals in the first stage comprises a pump signal having a longer wavelength than wavelengths of at least half of any remaining pump signals.

36. The amplifier of claim 31, wherein the at least one of the one or more pump signals comprises a pump signal having a longer wavelength than wavelengths of any remaining pump signals.

37. The amplifier of claim 31, wherein the at least one of the one or more pump signals comprises a plurality of pump signals each having a longer wavelength than wavelengths of at least half of any remaining pump signals.

38. The amplifier of claim 31, wherein a pump power in the first stage is adjusted to control the shape of the noise figure, and wherein a pump power in the second stage is adjusted to control the flatness of the gain of the wavelength signals.

39. The amplifier of claim 31, further comprising at least one additional amplification stage coupled between the first and second amplification stages.

40. The amplifier of claim 31, wherein one of the first and second Raman amplification stages of the amplifier comprises a distributed Raman amplifier, and wherein the other of the first and second Raman amplification stages of the amplifier comprises a discrete Raman amplifier.

41. The amplifier of claim 31, wherein the amplifier comprises a lossy element coupled between the first and second amplification stages.

42. The amplifier of claim 41, wherein the lossy element is selected from a group consisting of an optical add/drop multiplexer, an optical cross-connect, a gain equalizer, and an optical isolator.

43. The amplifier of claim 31, wherein the adjustment in pump power results in a change in magnitude of the noise figure.

44. The amplifier of claim 31, wherein a majority of the control of the characteristic of the noise figure occurs in the first Raman amplifier stage and a portion of the control of the characteristic of the noise figure occurs in another stage of the multi-stage amplifier.

45. The amplifier of claim 31, wherein a gain of the amplifier for a majority of the wavelengths of the multiple wavelength optical signal remains constant or decreases from its level prior to selectively adjusting the power of at least one of the one or more pump signals.

46. An optical amplifier operable to amplify a plurality of optical wavelength signals at least in part through Raman amplification, the amplifier including an amplifier stage comprising:
an input operable to receive a plurality of wavelength signals;
a pump assembly operable to generate one or more pump signals operable to interact with one or more of the plurality of wavelength signals over a gain medium to cause Raman amplification of the one or more wavelength signals; and
control circuitry operable to generate a control signal based at least in part on a signal proportional to a signal power of one or more of the plurality of wavelength signals at an input to the gain medium of the amplifier stage;
wherein the amplifier is operable to adjust the power of at least one of the one or more pump signals in response to the control signal, the adjustment of the power of the at least one pump signal approximately maintaining an intended shape of a noise figure associated with wavelength signals being amplified.

47. The amplifier of claim 46, wherein the control circuitry comprises a look-up table.

48. The amplifier of claim 47, wherein the look-up table comprises values operable to be adjusted over time to account for changes in amplifier characteristics over time.

49. The amplifier of claim 46, wherein the control signal is based at least in part on an output signal power of one or more of the plurality of wavelength signals output from the amplifier stage.

50. The amplifier of claim 46, wherein the control circuitry comprises logic operable to determine the control signal by applying an equation describing a relationship between an input signal power of one or more of the plurality of wavelength signals and pump power.

51. The amplifier of claim 40, wherein the control circuitry comprises a comparison circuit operable to determine a difference between an input signal power of one or more of the plurality of wavelength signals at the input to the amplifier and an output signal power of one or more of the plurality of wavelength signals at an output to the amplifier.

52. The amplifier of claim 40, wherein at least one of the one or more pump signals comprises a pump signal having a longer wavelength than wavelengths of at least half of any remaining pump signals.

53. The amplifier of claim 40, wherein the at least one of the one or more pump signals comprises a pump signal having a longer wavelength than wavelengths of any remaining pump signals.

54. The amplifier of claim 40, wherein the at least one of the one or more pump signals comprises a plurality of pump signals each having a longer wavelength than wavelengths of at least half of any remaining pump signals.

55. The amplifier of claim 40, further comprising an optical tap operable to direct a portion of each of the plurality of wavelength signals to the control circuitry, the portion comprising an optical signal having a total power that is proportional to the total power of the plurality of wavelength signals.

56. A method of amplifying a plurality of wavelength signals, comprising:
amplifying a plurality of wavelength signals;
adding wavelength signals to or dropping wavelength signals from the plurality of wavelength signals, wherein adding or dropping wavelength signals causes a change in a shape of a noise figure associated with the plurality of wavelength signals; and
selectively controlling the shape of the noise figure to obtain an intended shape of the noise figure as wavelength signals are added or dropped from the plurality of wavelength signals.

57. The method of claim 56, wherein amplifying the plurality of wavelength signals comprises amplifying the plurality of signals in a discrete Raman amplification stage.

58. The method of claim 56, wherein selectively controlling the shape of the noise figure results in changing the magnitude of the noise figure.

59. The method of claim 56, wherein selectively controlling the shape of the noise figure comprises approximately maintaining an intended shape of the noise figure.

60. The method of claim 56, wherein selectively controlling the shape of the noise figure comprises selectively adjusting a power of one or more pump signals driving at least one amplifier stage.

61. The method of claim 60, wherein the one or more pump signals each comprise a wavelength that is longer than wavelengths of at least half of any remaining pump signals.

62. The method of claim 60, wherein the one or more pump signals each comprise a wavelength that is longer than any of the other one or more pump signals.

63. The method of claim 60, wherein adjusting a power of one or more pump signals comprises adjusting the power of one or more pump signals based at least in part on a total power of the plurality of wavelength signals.

64. The method of claim 60, wherein the at least one amplifier stage comprises a first amplifier stage of a multiple stage amplifier.

65. A method of amplifying optical signals, comprising:
introducing to a gain medium of an amplifier stage one or more pump signals and a multiple wavelength signal comprising a plurality of wavelength signals;
detecting a change in a signal power of the multiple wavelength signal at an input to the gain medium of the amplifier age;
selectively adjusting a power of at least one of the one or more pump signals based at least in part on the detected change in signal power of the multiple wavelength signal to result in approximately maintaining an intended shape of a noise figure associated with the multiple wavelength signal.

66. The method of claim 65, wherein the at least one of the one or more pump signals comprises a pump signal having a longer wavelength than wavelengths of at least half of any remaining pump signals.

67. The method of claim 65, wherein the at least one of the one or more pumps signals comprises a pump signal having a longer wavelength than wavelengths of any remaining pump signals.

68. The method of claim 65, wherein the at least one of the one or more pump signals comprises a plurality of pump signals each having a longer wavelength than wavelengths of at least half of any remaining pump signals.

69. The method of claim 65, wherein detecting the change in signal power of the multiple wavelength signal comprises detecting a change in a total power of the multiple wavelength signal.

70. The method of claim 69, wherein detecting a change in the total power of the multiple wavelength signal comprises receiving at least a signal proportional to the total signal power of the multiple wavelength signal.

71. The method of claim 63, wherein detecting a change in the total power of the multiple wavelength signal comprises detecting a change of the total power of the multiple wavelength signal at or prior to the input to the gain medium.

72. The method of claim 63, wherein detecting a change in the total power of the multiple wavelength signal comprises detecting a change of the total power of the multiple wavelength signal at or after an output from the gain medium.

73. The method of claim 65, wherein detecting a change in signal power of the multiple wavelength signal comprises detecting a change in the number of wavelength signals in the plurality of wavelength signals.

74. The method of claim 65, wherein selectively adjusting a power of at least one of the one or more pump signals comprises adjusting the power of the at least one of the one or more pump signals in a first amplification stage of a multiple stage amplifier.

75. The method of claim 74, further comprising applying a gain flattening technique in a subsequent amplification stage to the first amplification stage.

76. The method of claim 75, wherein the gain flattening technique comprises adjusting a pump power in the subsequent amplification stage.

77. The method of claim 65, wherein adjusting the power of the at least one pump signal changes the magnitude of the noise figure.

78. The method of claim 65, wherein the gain medium comprises a transmission fiber in a distributed Raman amplification stage.

79. The method of claim 65, wherein the gain medium comprises a Raman gain fiber in a discrete Raman amplification stage.

80. An optical communication system operable to facilitate communication of multiple signal wavelengths, the system comprising:
one or more transmitters operable to generate alone or collectively a plurality of signal wavelengths;
a multiplexer operable to combine the plurality of signal wavelengths into a single multiple wavelength signal for transmission over a transmission medium; and
a plurality of optic amplifiers operable to receive the plurality of signal wavelengths, at least one of the optical amplifiers including an amplifier stage comprising:
a gain medium operable to amplify the multiple wavelength signal through interaction with one or more pump signals, the amplification occurring prior to, during, or after the multiple wavelength signal's transmission over the transmission medium;
wherein a power of at least one of the one or more pump signals is operable to be selectively adjusted in response to a change in a signal power of the plurality of wavelength signals at an input to the gain medium of the amplifier stage, the adjustment in pump power approximately maintaining an intended shape of a noise figure of the amplifier during operation of the amplifier.

81. The system of claim 80, wherein the at least one of the one or more pump signals comprises a longer wavelength pump signal.

82. The system of claim 81, wherein the longer wavelength pump signal comprises a pump signal comprising a longer wavelength than any of the other of the at least one pump signals.

83. The system of claim 80, wherein the at least one amplifier comprises control circuitry operable to generate a control signal based at least in part on a signal proportional to the signal power of the multiple wavelength signal, wherein the amplifier is operable to adjust the power of the at least one of the one or more pump signals in response to the control signal.

84. The system of claim 80, wherein the at least one of the one or more pump signals is operable to have its power selectively adjusted to contribute to approximately maintaining a shape of the noise figure as the signal power of the plurality of optical wavelength signals varies or as wavelength signals are added to or dropped from the plurality of wavelength signals.

85. The system of claim 80, wherein the at least one amplifier comprises a multiple stage amplifier.

86. The system of claim 85, wherein a majority of control of the shape of the noise figure occurs in a first amplifier stage of the multiple stage amplifier.

87. The system of claim 86, wherein a pump power in the first amplifier stage is adjusted to control the shape of the noise figure, and wherein a pump power in a second amplifier stage is adjusted to control the flatness of the gain of the wavelength signals.

88. The system of claim 86, wherein a pump power in the first amplifier stage is adjusted to control the shape of the noise figure, and when a gain flattening filter is applied to control the flatness of the gain of the wavelength signals.

89. The system of claim 80, wherein the at least one amplifier comprises a distributed Raman amplifier.

90. The system of claim 80, wherein the at least one amplifier comprises a discrete Raman amplifier.

91. The system of claim 80, wherein the at least one amplifier comprises a multiple stage amplifier comprising:
at least one stage comprising a distributed Raman amplifier; and
at least one stage comprising a discrete Raman amplifier.

92. The system of claim 80, wherein the at least one amplifier comprises a multiple stage amplifier comprising:
at least one stage of Raman amplification; and
at least one stage of rare-earth doped amplification.

93. The system of claim 80, wherein the at least one amplifier comprises a multiple stage amplifier, comprising a lossy element coupled between two amplification stages the lossy element.

94. The system of claim 93, wherein the lossy element is selected from a group consisting of an optical add/drop multiplexer, an optical cross-connect, a gain equalizer, and an optical isolator.

95. The system of claim 80, wherein the adjustment to the pump power results in a change in magnitude of the noise figure.

96. The system of claim 80, further comprising:
a demultiplexer operable to receive the multiple wavelength signal and to separate the signal wavelengths from the multiple wavelength signal; and
a receiver bank operable to receive the plurality of signal wavelengths.

97. A method of amplifying a plurality of wavelength signals, comprising:

amplifying a plurality of wavelength signals through interaction with one or more pump signals in a first Raman amplification stage;
receiving at a second Raman amplification stage at least some of the plurality of wavelength signals amplified by the first Raman amplification stage;
adjusting a power of a least one of the one or more pump signals in the first Raman amplification stage in response to a change in a power of the plurality of wavelength signals, the adjustment in pump power selectively controlling a shape of a noise figure associated with the first Raman amplification stage to obtain an intended shape of the noise figure.

98. The method of claim 97, wherein adjusting a power of at least one of the one or more pump signals in the first Raman amplification stage comprises adjusting a pump power in the first Raman amplification stage to approximately maintain the shape of the noise figure as it existed before the change in power of the plurality of wavelength signals.

99. An optical amplifier operable to amplify a plurality of optical wavelength signals at least in part through Raman amplification, the amplifier including an amplifier stage comprising:
an input operable to receive a plurality of optical signal wavelengths comprising at least a shorter optical signal wavelength and a longer optical signal wavelength;
a pump assembly operable to generate a plurality of pump signals operable to interact with one or more of the plurality of optical signal wavelengths over a gain medium to cause Raman amplification of the one or more optical signal wavelengths, wherein the plurality of pump signals comprise at least a shorter wavelength pump signal and a longer wavelength pump signal; and
a control module operable to generate a control signal based at least in part on a power of one or more of the plurality of optical signal wavelengths;
wherein the control signal is operable to be applied to adjust a power of at least the longer wavelength pump signal to obtain an improvement in a noise figure at the shorter optical signal wavelength and a degradation of a noise figure at the longer optical signal wavelength compared to a noise figure that would exist at those wavelengths without adjusting the pump power.

100. The optical amplifier of claim 99, wherein the control signal operates to cause a decrease in the power of the longer wavelength pump signal.

101. The optical amplifier of claim 99, wherein the control signal operates to cause an increase in power of the shorter wavelength pump signal.

102. The optical amplifier of claim 99, wherein the control signal operates to cause an increase in the power of the shorter wavelength pump signal and a decrease in the power of the longer wavelength pump signal.

103. A method of amplifying optical signals, comprising:
introducing to a gain medium one or more pump signals comprising a shorter wavelength pump signal and a longer wavelength pump signal, and a multiple wavelength signal comprising a shorter wavelength optical signal and a longer wavelength optical signal;
detecting a change in power of one or more of the multiple wavelength signals; and
selectively adjusting, based at least in part on the change in power of the one or more of the multiple wavelength signals, a power of at least the longer wavelength pump signal;

wherein the adjustment to the power of at least the longer wavelength pump signal results in an improvement in an optical noise figure associated with the shorter optical signal wavelength and a degradation of a noise figure at the longer optical signal wavelength compared to a noise figure that would exist at those wavelengths without adjusting the pump power.

104. The method of claim 103, wherein adjusting the power of at least the longer wavelength pump signal comprises decreasing the power of the longer wavelength pump signal.

105. A multiple stage Raman amplifier operable to amplify a plurality of optical wavelength signals, the amplifier comprising:
- a first Raman stage operable to receive a plurality of optical signal wavelengths comprising at least a shorter optical signal wavelength and a longer optical signal wavelength;
- a second Raman stage operable to receive at least a majority of the plurality of optical signal wavelengths after those wavelengths have passed through the first Raman stage;
- a pump assembly operable to generate a plurality of pump signals operable to interact with one or more of the plurality of optical signal wavelengths within the first Raman stage, wherein the plurality of pump signals comprise at least a shorter wavelength pump signal and a longer wavelength pump signal; and
- a control module operable to generate a control signal based at least in part on a power of one or more of the plurality of optical signal wavelengths;
- wherein the control signal is operable to be applied to adjust a power of one or more of the shorter wavelength pump signal and the longer wavelength pump signal to obtain an improvement in a noise figure at the shorter optical signal wavelength compared to a noise figure that would exist at those wavelengths without adjusting the pump power.

106. The optical amplifier of claim 105, wherein the control signal is operable to be applied to adjust a power of one or more of the shorter wavelength pump signal and the longer wavelength pump signal to obtain an improvement in a noise figure at the shorter optical signal wavelength and a degradation of a noise figure at the longer optical signal wavelength.

107. The optical amplifier of claim 105, wherein the control signal operates to cause a decrease in the power of the longer wavelength pump signal.

108. The optical amplifier of claim 105, wherein the control signal operates to cause an increase in power of the shorter wavelength pump signal.

109. The optical amplifier of claim 105, wherein the control signal operates to cause an increase in the power of the shorter wavelength pump signal and a decrease in the power of the longer wavelength pump signal.

110. A method of amplifying optical signals, comprising:
- receiving at a gain medium of a first Raman amplifier stage one or more pump signals comprising a shorter wavelength pump signal and a longer wavelength pump signal, and a multiple wavelength signal comprising a shorter wavelength optical signal and a longer wavelength optical signal;
- receiving at least a majority of the wavelengths of the multiple wavelength optical signal at a second Raman amplifier stage after those wavelengths have passed through the first Raman amplifier stage;
- detecting a change in power of one or more of the multiple wavelength signals; and
- selectively adjusting, based at least in part on the change in power of the one or more of the multiple wavelength signals, a power of at least one of the shorter wavelength pump signal and the longer wavelength pump signal;
- wherein the adjustment to the power of at least one of the shorter wavelength pump signal and the longer wavelength pump signal results in an improvement in an optical noise figure associated with the shorter optical signal wavelength compared to a noise figure that would exist at those wavelength without adjusting the pump power.

111. The method of claim 110, wherein the adjustment to the power of at least one of the shorter wavelength pump signal and the longer wavelength pump signal results in an improvement in an optical noise figure associated with the shorter optical signal wavelength and a degradation of a noise figure at the longer optical signal wavelength.

112. The method of claim 110, wherein adjusting the power of at least one of the shorter wavelength pump signal and the longer wavelength pump signal comprises decreasing the power of the longer wavelength pump signal.

* * * * *